US009134799B2

(12) United States Patent
Mark

(10) Patent No.: US 9,134,799 B2
(45) Date of Patent: Sep. 15, 2015

(54) INTERACTING WITH A PROJECTED USER INTERFACE USING ORIENTATION SENSORS

(75) Inventor: John Liam Mark, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 328 days.

(21) Appl. No.: 12/837,895

(22) Filed: Jul. 16, 2010

(65) Prior Publication Data
US 2012/0017147 A1 Jan. 19, 2012

(51) Int. Cl.
*G06F 3/033* (2013.01)
*G06F 3/01* (2006.01)
*G06F 1/16* (2006.01)
*G06F 3/0346* (2013.01)
*G06F 3/0482* (2013.01)
*G06F 3/0488* (2013.01)
*H04N 9/31* (2006.01)

(52) U.S. Cl.
CPC .............. *G06F 3/017* (2013.01); *G06F 1/1639* (2013.01); *G06F 1/1694* (2013.01); *G06F 3/0346* (2013.01); *G06F 3/0482* (2013.01); *G06F 3/04883* (2013.01); *H04N 9/3173* (2013.01); *H04N 9/3179* (2013.01); *G06F 2203/04802* (2013.01)

(58) Field of Classification Search
CPC ..................................................... G06F 1/1639
See application file for complete search history.

(56) References Cited

U.S. PATENT DOCUMENTS

| | | | | |
|---|---|---|---|---|
| 6,489,934 | B1 * | 12/2002 | Klausner ......................... | 345/1.1 |
| 6,544,123 | B1 | 4/2003 | Tanaka et al. | |
| 6,764,185 | B1 * | 7/2004 | Beardsley et al. ............ | 353/122 |
| 7,284,866 | B2 * | 10/2007 | Buchmann ....................... | 353/42 |
| 7,883,221 | B2 * | 2/2011 | Nozaki et al. .................. | 353/122 |
| 8,351,983 | B2 * | 1/2013 | Kim et al. ................... | 455/556.1 |
| 8,462,262 | B2 * | 6/2013 | Yang et al. ..................... | 348/373 |

(Continued)

FOREIGN PATENT DOCUMENTS

| | | |
|---|---|---|
| CN | 101533572 A | 9/2009 |
| JP | 05049074 | 2/1993 |

(Continued)

OTHER PUBLICATIONS

Blasko G, et al., "Exploring interaction with a simulated wrist-worn projection display", Wearable Computers, Proceedings Ninth IEEE International Symposium on Osaka, Japan Oct. 18-21, 2005, Piscataway, NJ, USA,IEEE, Oct. 18, 2005, pp. 2-9, XP031866821, DOI: 10.1109/ISWC.2005.21 ISBN: 978-0-7695-2419-1.

(Continued)

*Primary Examiner* — Scott Baderman
*Assistant Examiner* — Asher Kells
(74) *Attorney, Agent, or Firm* — Shirin Tefagh; Joseph Agusta

(57) ABSTRACT

Aspect methods and systems enable interaction with projected user interface through user input gestures performed on a mobile device. The mobile device may project the user interface image on an external surface, such as from a pico projector, and detect user input gestures performed by users. The mobile device may interpret the detected user input gestures, and change the projected user interface image in response to the interpreted user input gestures. User input gestures may be in the form of touch gestures performed on a touchscreen of the mobile device and/or in the form of hand gestures performed by turning, rotating and/or hoping the mobile device.

50 Claims, 35 Drawing Sheets

(56) References Cited

U.S. PATENT DOCUMENTS

| | | | |
|---|---|---|---|
| 8,478,366 B2* | 7/2013 | Shin et al. | 455/575.1 |
| 8,485,668 B2* | 7/2013 | Zhang et al. | 353/28 |
| 8,579,442 B2* | 11/2013 | Plut | 353/39 |
| 2002/0033849 A1* | 3/2002 | Loppini et al. | 345/848 |
| 2002/0063855 A1 | 5/2002 | Williams | 353/122 |
| 2004/0207823 A1* | 10/2004 | Alasaarela et al. | 353/122 |
| 2005/0099607 A1 | 5/2005 | Yokote et al. | |
| 2005/0259618 A1* | 11/2005 | Ahya et al. | 370/331 |
| 2006/0146015 A1* | 7/2006 | Buchmann | 345/156 |
| 2007/0030455 A1* | 2/2007 | Inoue | 353/15 |
| 2007/0040800 A1* | 2/2007 | Forlines et al. | 345/158 |
| 2007/0064199 A1* | 3/2007 | Schindler et al. | 353/30 |
| 2007/0143791 A1* | 6/2007 | Sammarco | 725/38 |
| 2007/0190995 A1* | 8/2007 | Wang et al. | 455/419 |
| 2007/0205980 A1* | 9/2007 | Dijk | 345/156 |
| 2007/0259657 A1* | 11/2007 | Cheng | 455/419 |
| 2007/0265717 A1* | 11/2007 | Chang | 700/83 |
| 2007/0293194 A1* | 12/2007 | Bisht | 455/411 |
| 2008/0018591 A1* | 1/2008 | Pittel et al. | 345/156 |
| 2008/0049192 A1* | 2/2008 | Nozaki et al. | 353/25 |
| 2009/0091710 A1* | 4/2009 | Huebner | 353/28 |
| 2009/0143098 A1* | 6/2009 | Shiono | 455/556.1 |
| 2009/0244490 A1* | 10/2009 | Nakamura | 353/43 |
| 2010/0085316 A1* | 4/2010 | Kim | 345/173 |
| 2010/0093399 A1* | 4/2010 | Kim et al. | 455/566 |
| 2010/0099457 A1* | 4/2010 | Kim | 455/556.1 |
| 2010/0099464 A1* | 4/2010 | Kim | 455/566 |
| 2010/0103101 A1* | 4/2010 | Song et al. | 345/158 |
| 2010/0105428 A1* | 4/2010 | Kim | 455/556.1 |
| 2010/0188428 A1* | 7/2010 | Shin et al. | 345/661 |
| 2010/0210312 A1* | 8/2010 | Kim et al. | 455/566 |
| 2011/0102455 A1* | 5/2011 | Temple | 345/619 |
| 2011/0151936 A1* | 6/2011 | Jang et al. | 455/566 |
| 2011/0183654 A1* | 7/2011 | Lanier et al. | 455/414.1 |
| 2011/0191690 A1* | 8/2011 | Zhang et al. | 715/746 |
| 2011/0197147 A1* | 8/2011 | Fai | 715/753 |
| 2012/0038592 A1* | 2/2012 | Shyu et al. | 345/175 |
| 2012/0098754 A1* | 4/2012 | Kim | 345/173 |

FOREIGN PATENT DOCUMENTS

| | | |
|---|---|---|
| JP | 2000284879 A | 10/2000 |
| JP | 2004363930 A | 12/2004 |
| JP | 2005122696 A | 5/2005 |
| JP | 2005128506 A | 5/2005 |
| JP | 2006234909 A | 9/2006 |
| JP | 2007241537 A | 9/2007 |
| JP | 2009168887 A | 7/2009 |
| KR | 20100039024 A | 4/2010 |
| WO | WO-2010056548 A1 | 5/2010 |

OTHER PUBLICATIONS

International Search Report and Written Opinion—PCT/US2011/034106—ISA/EPO—Nov. 11, 2011.

Zetter, Kim, "TED: MIT Students Turn Internet Into a Sixth Human Sense"; Business People and Technologies That Matter/Miscellaneous, http://www.wired.com/business/2009/02/ted-digital-six/.

* cited by examiner

INTERACTING WITH A PROJECTED USER INTERFACE USING ORIENTATION SENSORS

FIELD

The present application relates generally to computing device user interfaces, and more particularly to a user interface for hand held computing device for manipulating projected images.

BACKGROUND

Wireless communication technologies have seen explosive growth over the past few years. This growth has been fueled by wireless services providing freedom of movement to the mobile public, and cutting the tether to hardwired communication systems. As a result of ever-increasing capabilities of mobile device applications, the popularity of mobile devices is expected to continue to grow. As mobile devices become more powerful and perform more functions, there is increasing demand for larger and more interactive display screens to support the increasing functionality of these devices. At the same time, users demand ever lighter and more portable mobile devices.

SUMMARY

The various aspects provide methods and system for a projected user interface for mobile devices. In an aspect, a method for providing a user interface for a mobile device includes projecting a user interface image, detecting a user input gesture, identifying functionality associated with the detected user input gesture, and changing the projected user interface image based on the interpreted gesture. In such a method, detecting a user input gesture may include receiving a touch event from a touch screen display, and correlating the received touch event to a particular touch gesture. Detecting a user input gesture may include receiving signals from orientation sensors within the mobile device, and correlating the received sensor signals to a hand gesture. The orientation sensors may include one or more accelerometers. Correlating the received sensor signals to a hand gesture may include recognizing the hand gesture as being one of a tilt of the mobile device, a turn of the mobile device, a rotation of the mobile device, and a rapid movement of the mobile device. In an aspect, the method may further include identifying a functionality corresponding to the correlated hand gesture, and implementing the identified functionality, in which changing the projected user interface image based on the interpreted gesture comprises changing the user interface image based upon the implemented functionality. Implementing the identified functionality may include accomplishing one of scrolling a list, moving an image object, changing a zoom factor applied to an image object displayed within the projected user interface image, selecting an object within the projected user interface image, copying an object displayed within the projected user interface image, deleting an object displayed within the projected user interface image, executing an application associated with an object displayed within the projected user interface image, and movement of a pointing icon displayed within the user interface image. Projecting a user interface image may include projecting an image that appears to be three dimensional when viewed with special 3-D glasses. The projected image may be configured so that image objects appear positioned about a surface of a sphere, and wherein changing the projected user interface image based on the interpreted gesture comprises changing the projected user interface image so that the sphere appears to rotate about one or two axes to position different image objects in a foreground position. In an aspect, the method may further include highlighting an image object located in a center of the projected user interface image, and selecting the highlighted image object in response to a user input. In an aspect, the method may further include establishing a communication link with a second mobile device, receiving a message from the second mobile device including information regarding changes to the user interface image based on the interpreted gesture, and changing the user interface image based on the information received from the second mobile device regarding changes to the user interface image. In an aspect, the method may further include adjusting an angle of the projected user interface image to maintain the projected image approximately steady within a limited angle of tilt or turn. In an aspect, the method may further include changing the projected user interface image to maintain image objects in an approximately constant position with respect to an external surface onto which the image is projected.

In a further aspect, a mobile device may include a projector, such as a pico projector, coupled to a processor, in which the processor is configured with processor-executable instructions to perform operations including projecting a user interface image, detecting a user input gesture, identifying functionality associated with the detected user input gesture, and changing the projected user interface image based on the interpreted gesture. In an aspect, the mobile device may further include orientation sensors coupled to the processor, and the processor may be configured with processor-executable instructions to also perform some or all of the other operations of the above described methods.

In a further aspect, a mobile device may include means for projecting a user interface image, means for detecting a user input gesture, means for identifying functionality associated with the detected user input gesture, and means for changing the projected user interface image based on the interpreted gesture. In an aspect, the mobile device may also include as means for performing some or all of the other operations of the above described methods.

In a further aspect, a non-transitory processor-readable storage medium may have stored thereon processor-executable instructions configured to cause a processor of a mobile device to perform operations including projecting a user interface image, detecting a user input gesture, identifying functionality associated with the detected user input gesture, and changing the projected user interface image based on the interpreted gesture. In an aspect, the non-transitory processor-readable storage medium may also have stored thereon processor-executable instructions configured to cause a processor of a mobile device to perform some or all of the other operations of the above described methods.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

Figure 1:
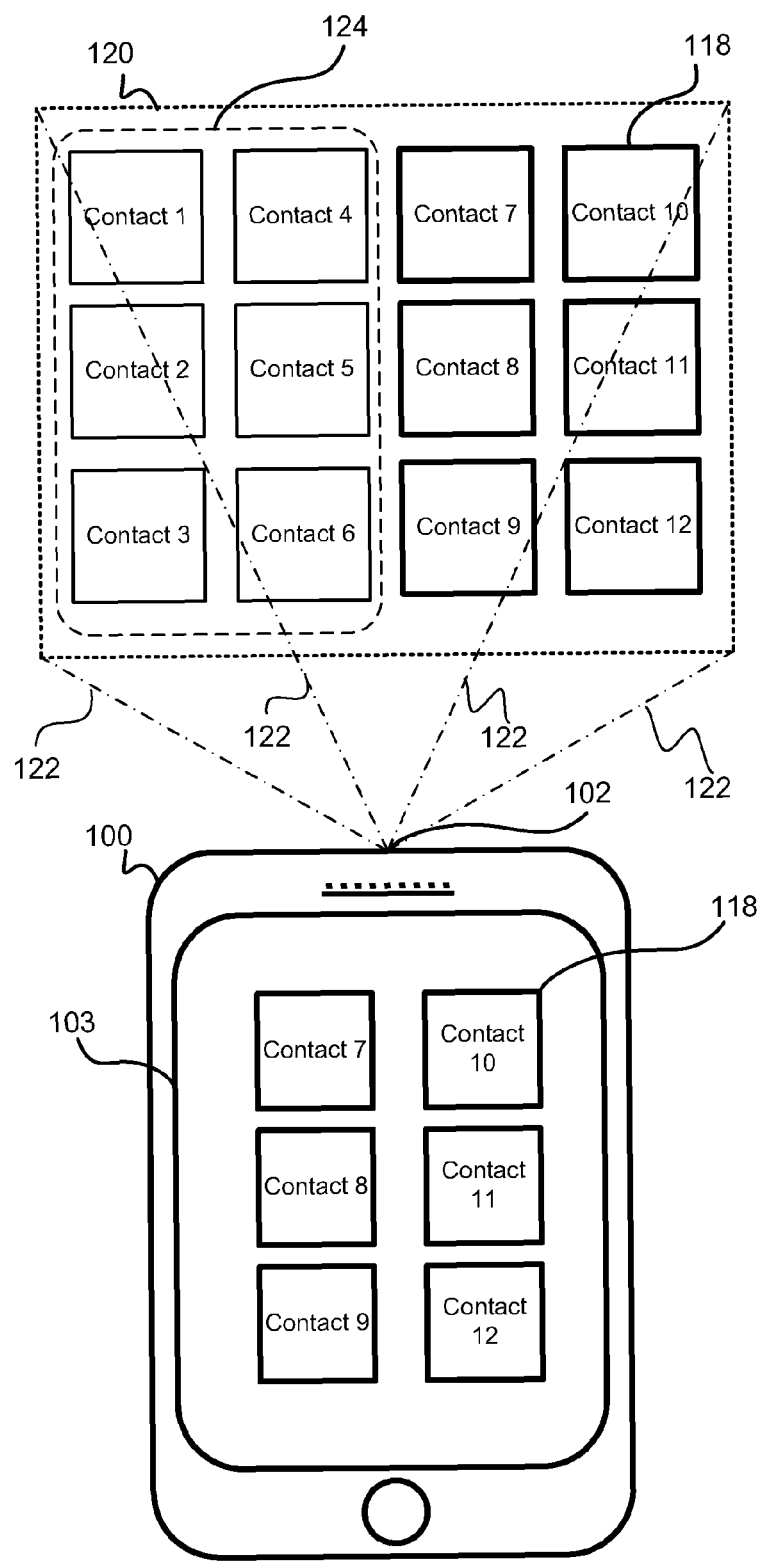
FIG. 1 is an illustration of a mobile device projecting a mobile device user interface.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "mobile device" and "computing device" are used interchangeably herein to refer to any one or all of portable computing devices, personal mobile television receivers, cellular telephones, personal data assistants (PDA's), palm-top computers, wireless electronic mail receivers (e.g., the Blackberry® and Treo® devices), multimedia Internet enabled cellular telephones (e.g., the Blackberry Storm®), and similar personal electronic devices which include a programmable processor and memory, and a projector for projecting images onto a surface.

As mobile devices become increasingly powerful and perform increasingly more sophisticated functions, the complexity of application options and the increased number of files may be stored on mobile devices create a demand for larger and more interactive displays to support such functionality. At the same time, user preferences for portability are causing mobile device manufacturers to create smaller and lighter devices. Smaller mobile devices means that the available real estate for a display screen is limited.

To address these conflicting requirements for smaller devices with greater functionality, the various aspects provide methods and systems for projecting the user interface display onto an external surface, such as by the means of an integrated pico projector, and enabling users to interact with the mobile device through a user interface coupled to the projected image using intuitive gestures. By projecting the user interface display on an external surface, the mobile device can provide a larger display field enabling more content to be displayed that would be possible on the small screen of the mobile device. In the various aspects, a mobile device may project the user interface display onto an external surface, and detect and interpret finger and/or hand gestures of the user with the resulting interaction displayed on the projected user interface image. In various aspects, the projected user interface display may include the same content as presented on the mobile device physical display screen, or more content than is presented on the mobile device display screen.

A variety of intuitive user interface gestures may be supported by the projected user interface. In some aspects or implementations, user interactions with the mobile device, such as pushing buttons (e.g., the arrow keys) or touching a touchscreen surface of the device (which are referred to herein as "touch gestures"), can be treated as user inputs which are reflected on the projected user interface display. Such capabilities may enable new forms of interactions with the mobile devices and their applications and stored files. For example, scrolling touch gestures may be configured to span more files than compatible with the small displays screen of the mobile device. As another example, touches to the touchscreen surface may cause the mobile device to project spots, such as virtual laser spots, on the projected image.

In some aspects or implementations, movements of the mobile device may be interpreted as user interface gestures (which are referred to herein as "hand gestures"). For example, a rapid redirection of the mobile device to the left or the right may be detected by accelerometers within the device and interpreted as commands to shift the displayed image to the left or the right, or scroll a list. As another example, a rapid twist of the mobile device along a long axis may be interpreted as a command to scroll or increment a list, select a file, increase zoom, etc. Mobile devices may be equipped with three axis accelerometer which can sense the gravity gradient, and thus the spatial orientation of the mobile device, may interpret changes in the orientation (e.g., tilt angle or rotation angle) as user input commands, such as to scroll a list of left or right or up or down (depending upon the tilt or rotation angle), increase or decrease as zoom, position files within the display, etc. Such capabilities can also enable new forms of user interaction with applications for stored content. For example, lists of files may be organized on a virtual spherical surface which may be rotated around vertical and horizontal axes by tilting the mobile device (e.g., left or right and up or down) as if rolling a ball in virtual space.

In some aspects, the projected user interface image is not adjusted for changes in the device orientation. In another aspect, the projected user interface image may be adjusted to maintain a particular orientation or displayed content while the device is moved or manipulated. In an aspect, the lens of the pico projector may be manipulated, such as with mechanical manipulators, in order to hold the projected image study on the external surface while the user performs hand gestures. In another aspect, the displayed image is adjusted (e.g., by moving objects in the image in the opposite direction of the movement of the display on the external surface) so that objects within the image appeared and remained steady on the surface. In this manner, displayed objects may appear to be fixed with respect to the external surface while the projection frame moves about on the surface in response to movements of the mobile device.

In a further aspect, multiple mobile devices may interact with a user interface display projected by one of the mobile devices. In this manner, user input gestures, such as touches to arrow keys or a touchscreen, or hand gestures performed by manipulating the mobile devices, may cause the projecting mobile device adjusted projected image to reflect the user inputs from the other mobile devices. This capability may enable new forms of user interactions with projected images, such as using cellular telephones to generate virtual laser spots on the projected image, or manipulating their cellular telephones (e.g., tilting, rotating, waving or otherwise moving their telephones) in order to control or impact the displayed image.

The various aspects have a number of useful applications beyond the following examples of user interface list selections and interacting with image objects projected on external surface. For example, the projected user interface of the various aspects may enable users to "surf the web" by projecting a web browser image on an external surface and receiving user inputs for selecting hyperlinks and otherwise navigating through Internet webpage connections via the various techniques described herein. The larger size display possible with a projection system compared to the physical display of a mobile device may enable users to view the entire webpage with readable font sizes, which is not possible on typical mobile device physical displays. Another useful application employs the projected user interface capability to support videoconference calls, leveraging the larger size image generated by a projector.

An example of an aspect mobile device 100 projecting a user interface display is illustrated in FIG. 1. A mobile device 100 may include a pico projector 102 coupled to a user interface system. The pico projector 102 projects an image (illustrated by dashed lines 122) onto an external surface (e.g., a wall) in the form of a projected frame 120 including image objects 118 (e.g., contact listings as shown in this example illustration). The mobile device 100 may also include a display screen 103 on which the mobile device 100 may display a conventional user interface image 103 including the image objects 118. Since the projected image can be much larger, depending upon the distance to the external surface, the projected user interface image within the projected frame 120 may encompass more image objects 118 then can be included within the mobile device display 103. For example, in the example illustrated in FIG. 1, the limited size of the mobile device display 103 limits the number of contact image items 118 that can be displayed to six items, while the projected frame 120 includes sufficient space to display 12 image objects 118. The additional image objects 118 supported by the projected user interface are indicated by dashed line 124. To view these additional contacts image objects 118 on the mobile device's conventional display 103, the user would have to scroll through the contacts list, such as by implementing a flick gesture on the touch screen. Thus projecting the user interface display onto an external surface enables more content to be included within the display than is possible on many mobile devices.

Figure 2A:
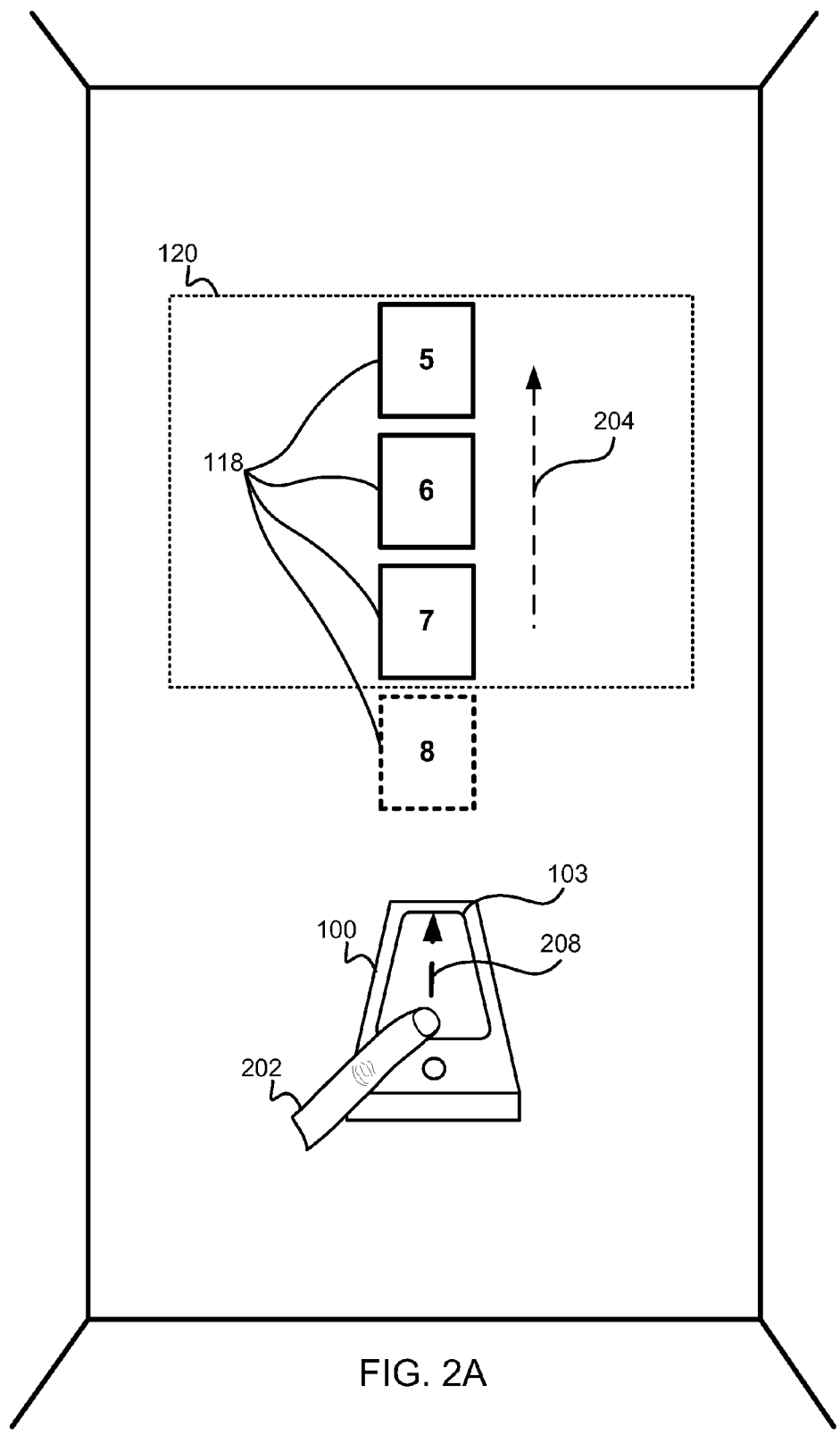
FIGS. 2A-2C are illustrations of user interactions with a mobile device via a projected mobile device user interface using touch gestures.
Figure 2B:
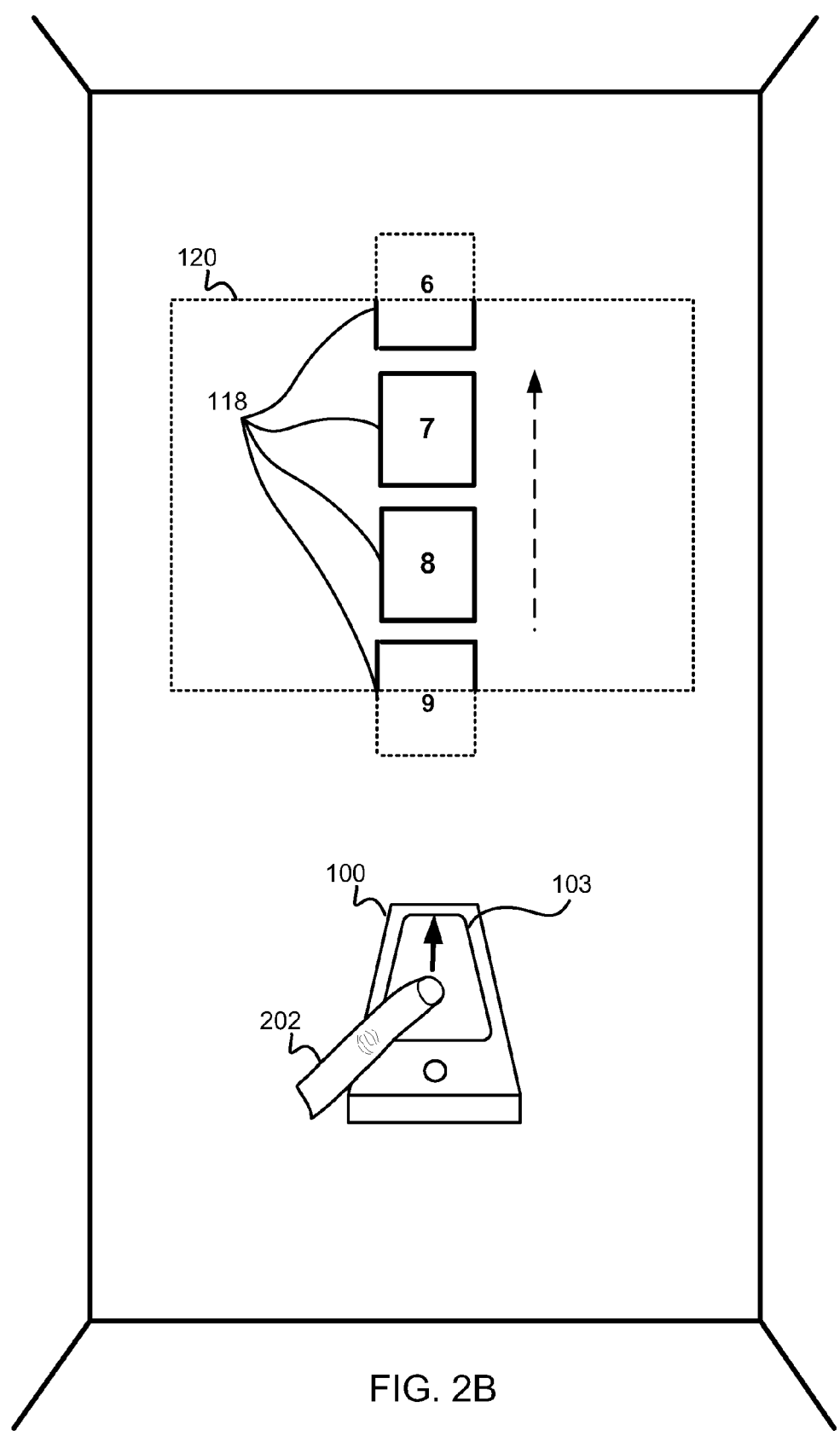
Figure 2C:
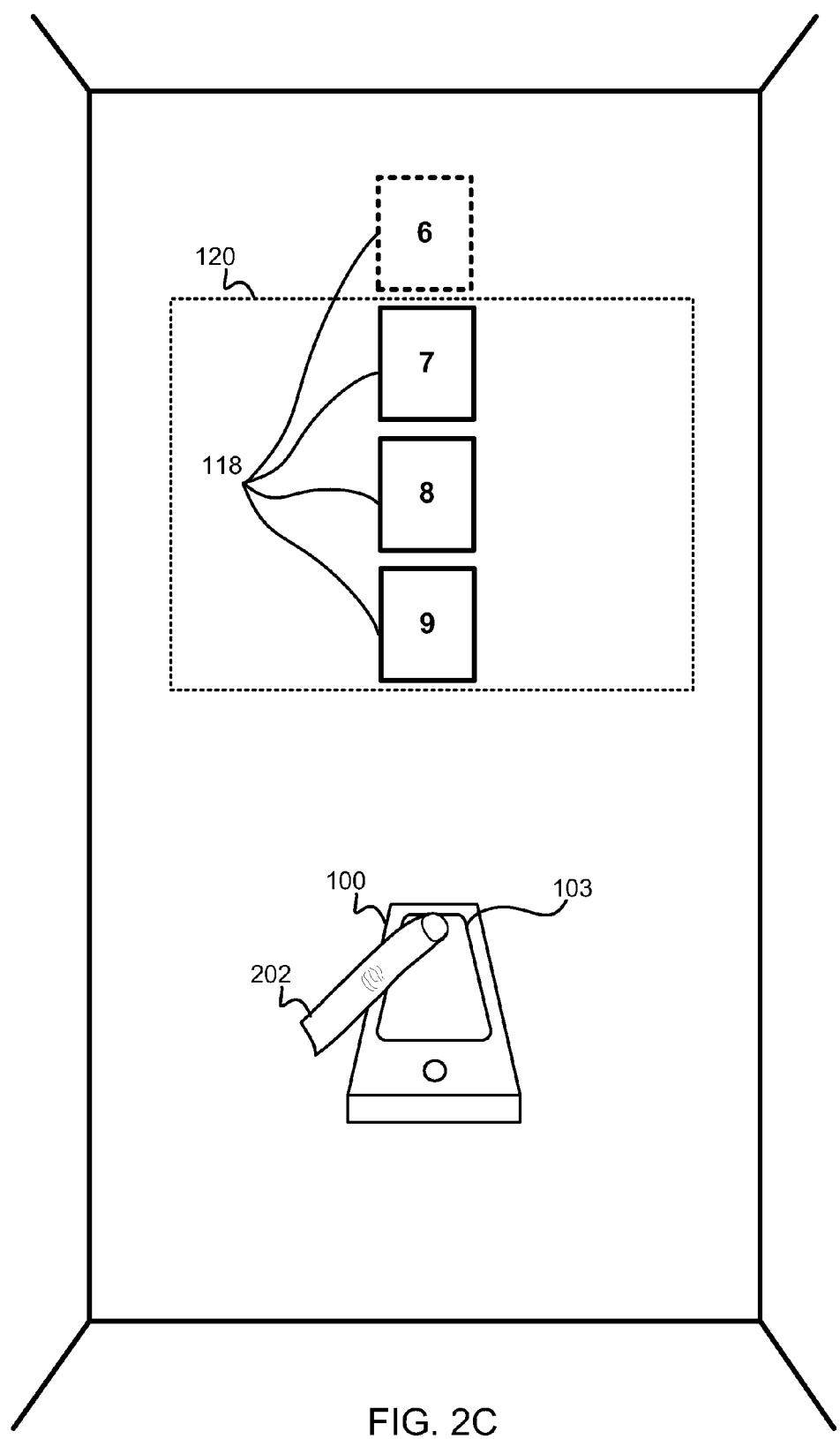

With the user interface image projected onto an external surface, new methods for interfacing with the mobile device are enabled. For example, FIGS. 2A, 2B, and 2C illustrate a user interacting with a list application (e.g., a series of photographs thumbnails, contact records, etc.) by manipulating a touchscreen 103 to cause the displayed contents to shift positions within the projected frame 120. While not shown in FIGS. 2A, 2B, and 2C, the user may similarly interact with the mobile device by pressing arrow keys or other physical keys on the device. In a long list of objects, the projected frame 120 may not be large enough to display more than a portion of the list contents. For example, FIG. 2A illustrates a list of image objects 118 in which only items 5, 6, and 7 can be seen, while another image object 8 is no visible as positioned below the projected frame 120. To view other image objects 118 beyond the boundary of the projected frame 120, a user may initiate a finger gesture 208, by placing a finger 202 on the touch screen display 103 of the mobile device 100.

A variety of different types of touch gestures that may be used to interact with the mobile device using the projected user interface. FIG. 2A illustrates an example touch gesture in which a simple finger drag 208 across the surface of the touch screen 103 is interpreted by the mobile device user interface to indicate a list scroll, such as moving the image objects 118 in the vertical direction is indicated by the dashed arrow 204. In a similar manner, a press of a down or up arrow key may indicate a list scroll.

The result of the example touch gesture illustrating in FIG. 2A is illustrated in FIG. 2B. As the user traces the upward touch gesture with a finger 202 on the touch screen 103, the mobile device 100 may be configured to detect the touch event, interpret the touch gesture, implement the corresponding function, and revise the projected user interface display to reflect the change. In the illustrated example, the touch gesture is traced in an upward direction, so the image objects 118 move in an upward direction towards the upper boarders of the projected frame 120. As the image object 6 moves out of the projected frame 120, the next image object 9 enters the projected frame 120 from the bottom boarder. FIG. 2C illustrates the result at the conclusion of the touch gesture.

In an aspect, the movement of the image objects 118 within the projected frame 120 corresponds to the movement of the touch gesture, so the user receives feedback from the projected image. Thus, if the user were to reverse the direction of the touch gesture, the movement of the image objects 118 will similarly be reversed. To accomplish this, the mobile device 100 may be configured to recognize and implement the touch gesture in a manner such that the speed and direction of movement of image objects 118 on the projected frame 120 corresponds to the speed and direction of the user's touch gesture. In a further aspect, the speed of movement of image objects on the projected user interface display may be a multiple or fraction of the speed of the gesture, with the multiple or fraction determined as a user preference, a display parameter controlled in application, or a parameter determined by the mobile device operating system.

A mobile device 100 may further be configured to implement different functions based on varying parameters of a touch gesture. For example, the speed in which a user traces a touch gesture may determine the type of scrolling function that may be implemented by the mobile device 100. The mobile device 100 may be configured to interpret a fast touch gestures (e.g., a flick) to mean a fast scroll which may automatically scroll through the displayed content at a fast pace. In a further aspect, the user may have to touch the touch sensitive screen to stop the automatic scrolling.

Figure 3A:
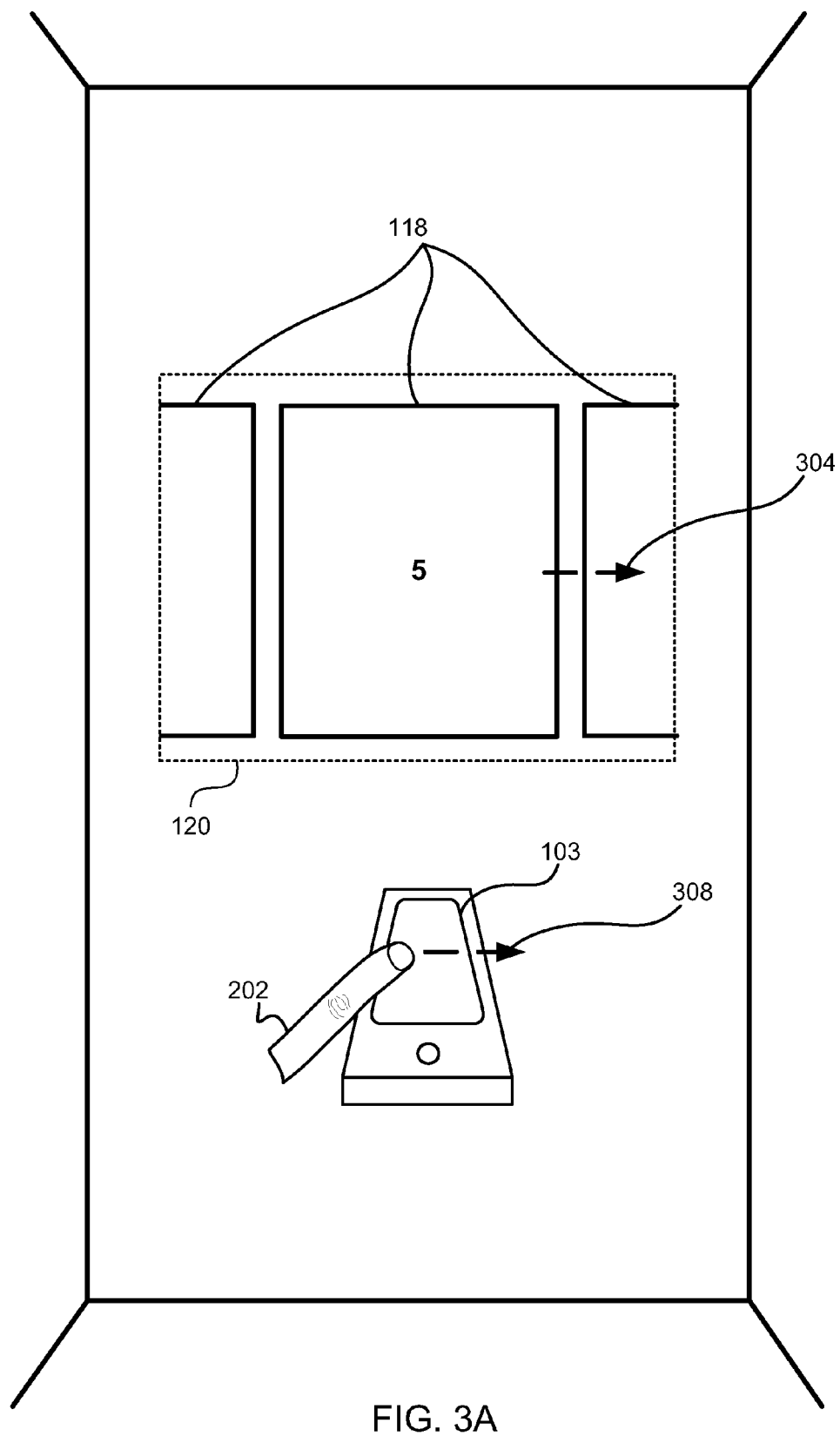
FIGS. 3A-3C are illustrations of user interactions with a mobile device via a projected mobile device user interface using touch gestures.
Figure 3B:
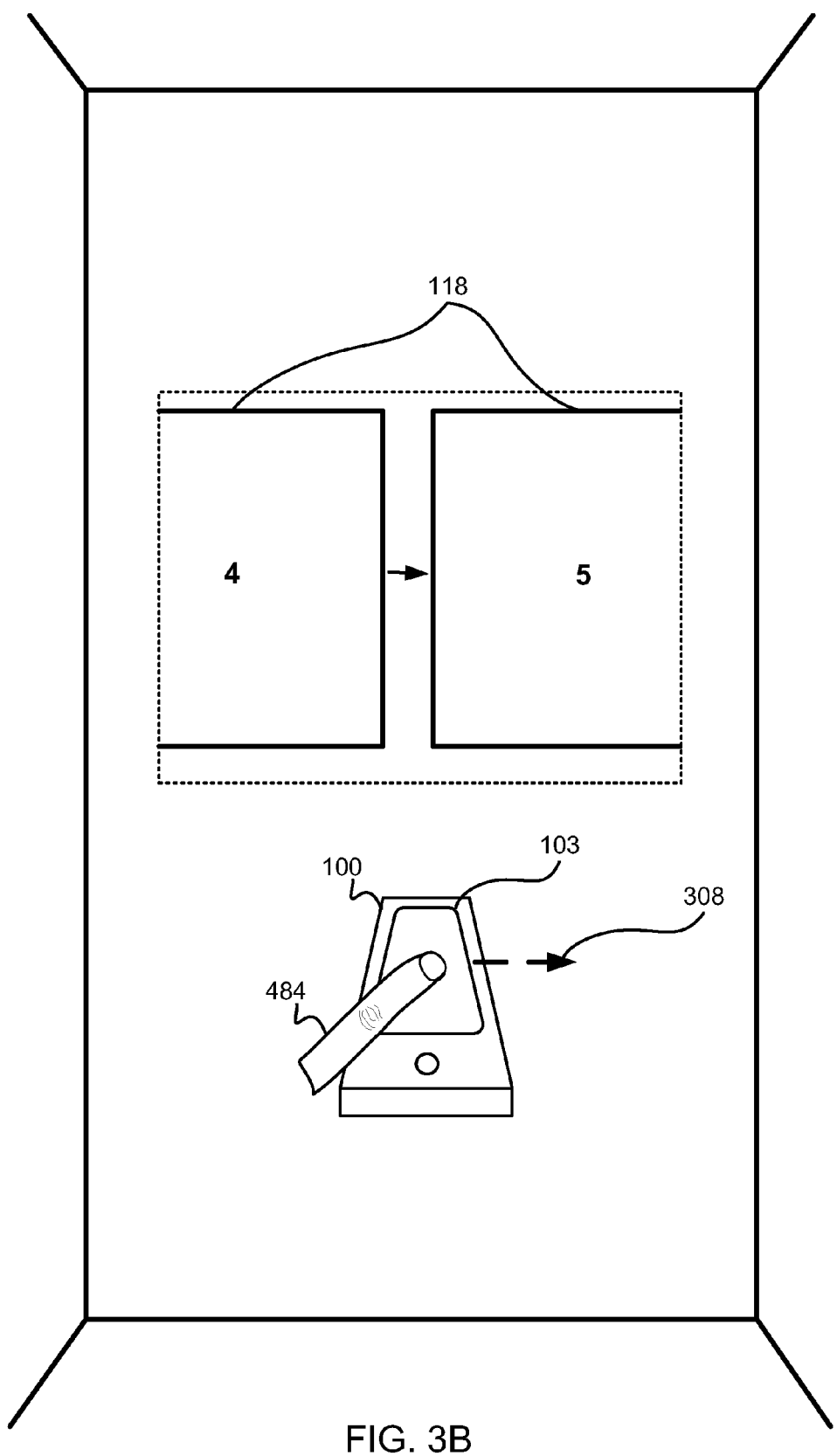
Figure 3C:
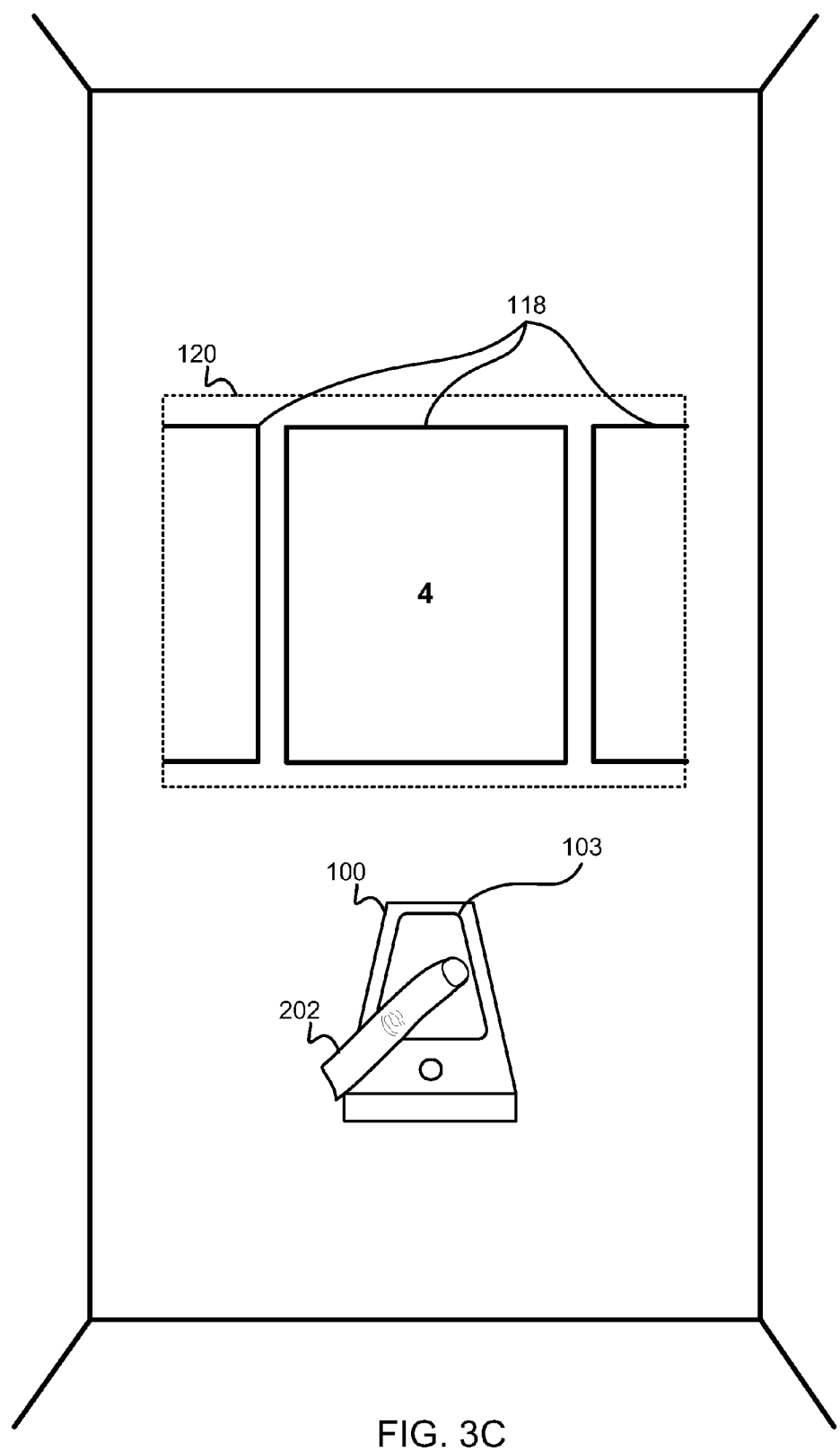

FIGS. 3A, 3B, and 3C illustrate another touch gesture for interacting with list items using a touch gesture in conjunction with a projected user interface according to an aspect. In the example illustrated in FIG. 3A, a user's finger 202 tracing a touch gesture 308 across the width of the touch screen display 103 of the mobile device 100 causes a list of image objects 118 to scroll laterally as shown by arrow 304.

As illustrated in FIG. 3B, as the user's finger slides across the touch screen display 103, the projected image objects 118 move in a coordinated matter (e.g., from left to right) to display the next picture 118. Thus, when the user's finger is halfway across the touch screen display 103, a portion of both image objects 4 and 5 are displayed. In this manner, the user can see the result of the touch gesture on the projected user interface image. The completion of the example touch gesture function is illustrated in FIG. 3C which shows the scroll to the right complete.

Another form of user input gestures that may be implemented on the various aspects is accomplished by moving the mobile device itself and a manner that can be sensed by accelerometers or other sensors within the device. Many models of smart phones currently available on the market include GPS receivers as well as accelerometers which can sense the orientation of the device in one or two dimensions. For example, several models of smart phones include accelerometers which enable the device to recognize when it is being held vertically or horizontally so that the processor can transform the displayed image from portrait to landscape mode as appropriate. By including three accelerometers, full 3-axis orientation information can be determined. Combining such 3-axis orientation information with the 3-axis location information provided by a GPS receiver can provide mobile devices with true 6-axis location and motion detection capability. Such 6-axis position/orientation information may be leveraged by the various aspects to recognize user input gestures associated with the orientation or movement of the mobile device.

Figure 4A:
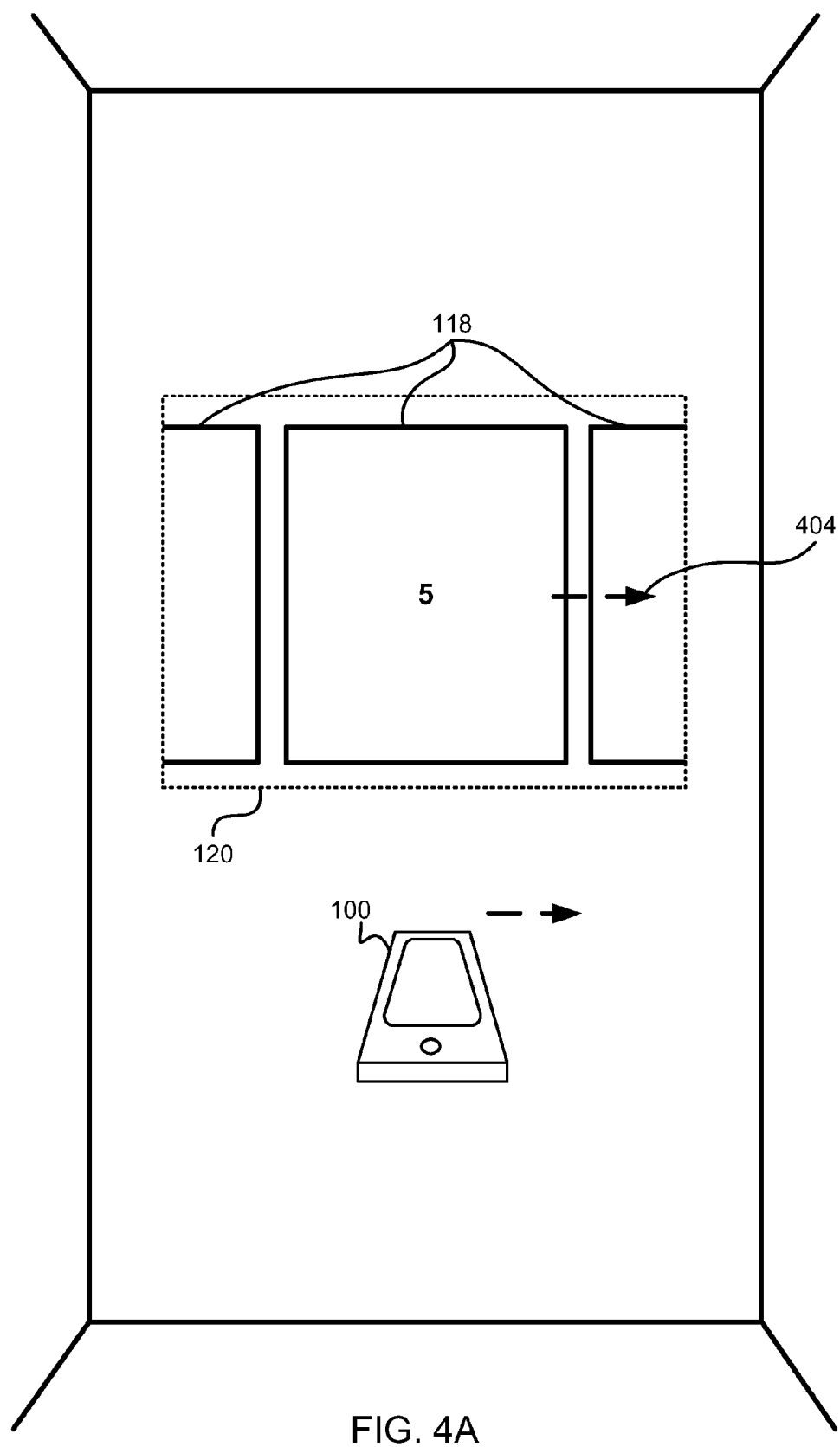
FIGS. 4A-4D are illustrations of user interactions with a mobile device via a projected mobile device user interface using hand gestures.
Figure 4B:
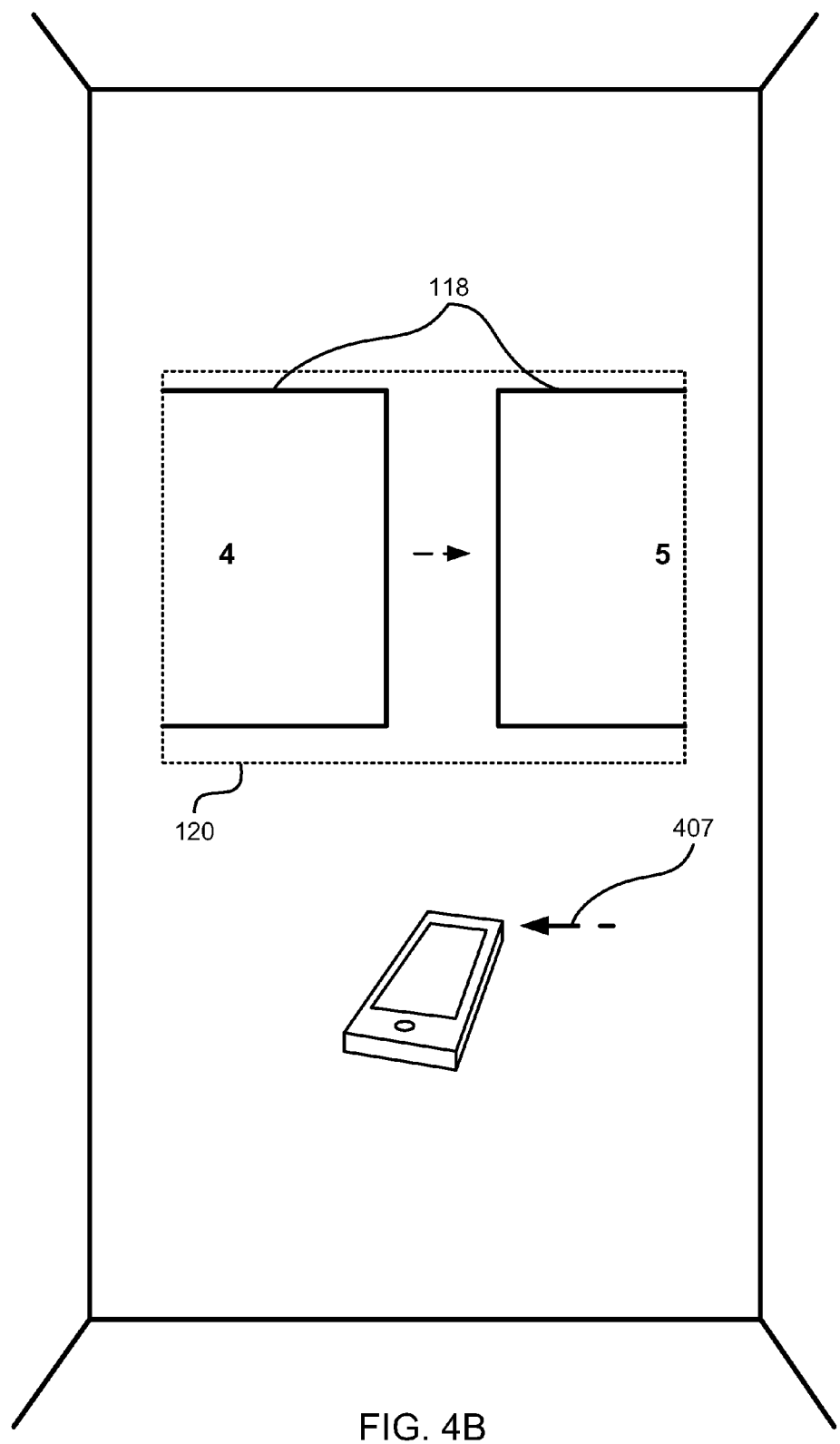
Figure 4C:
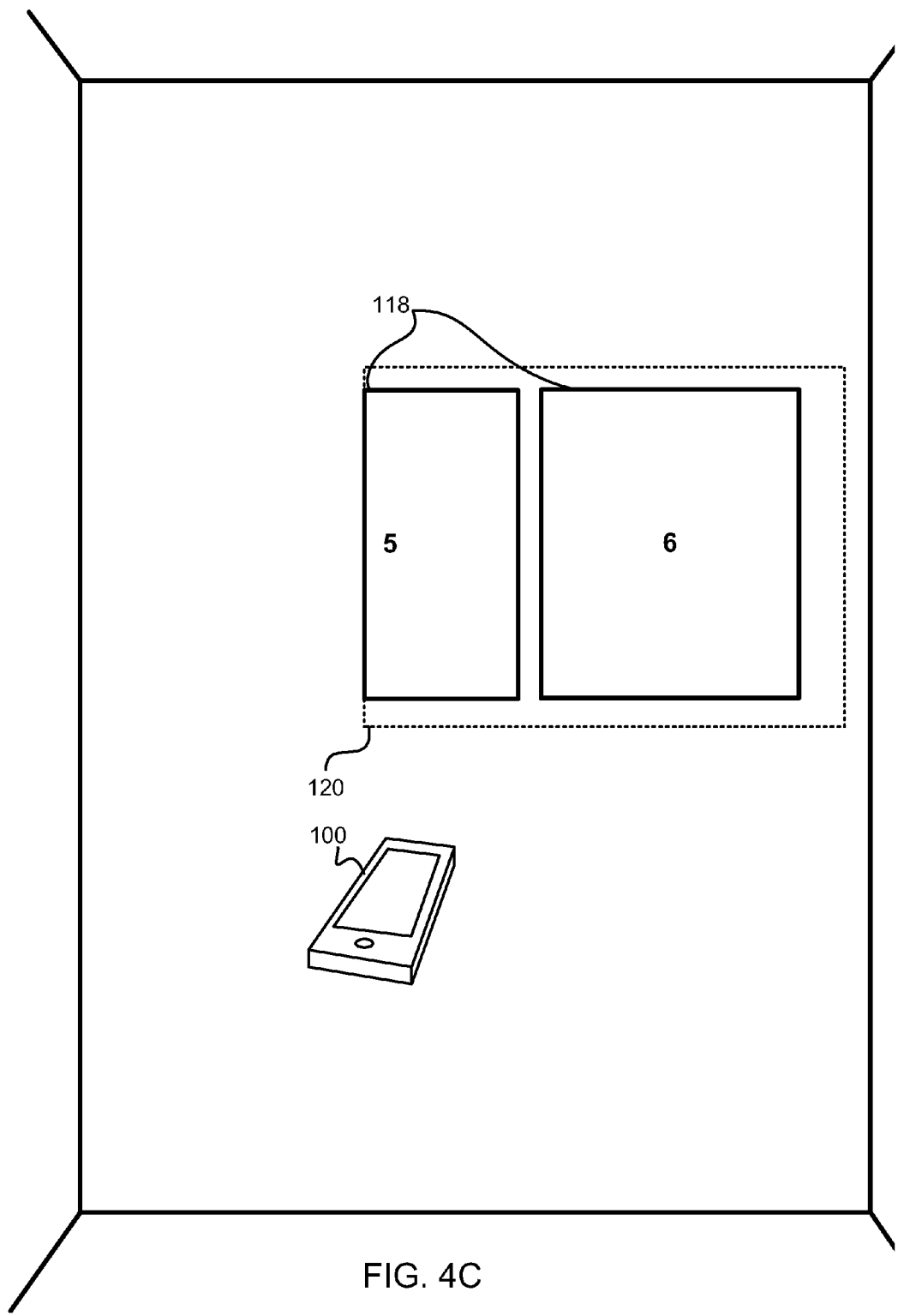
Figure 4D:
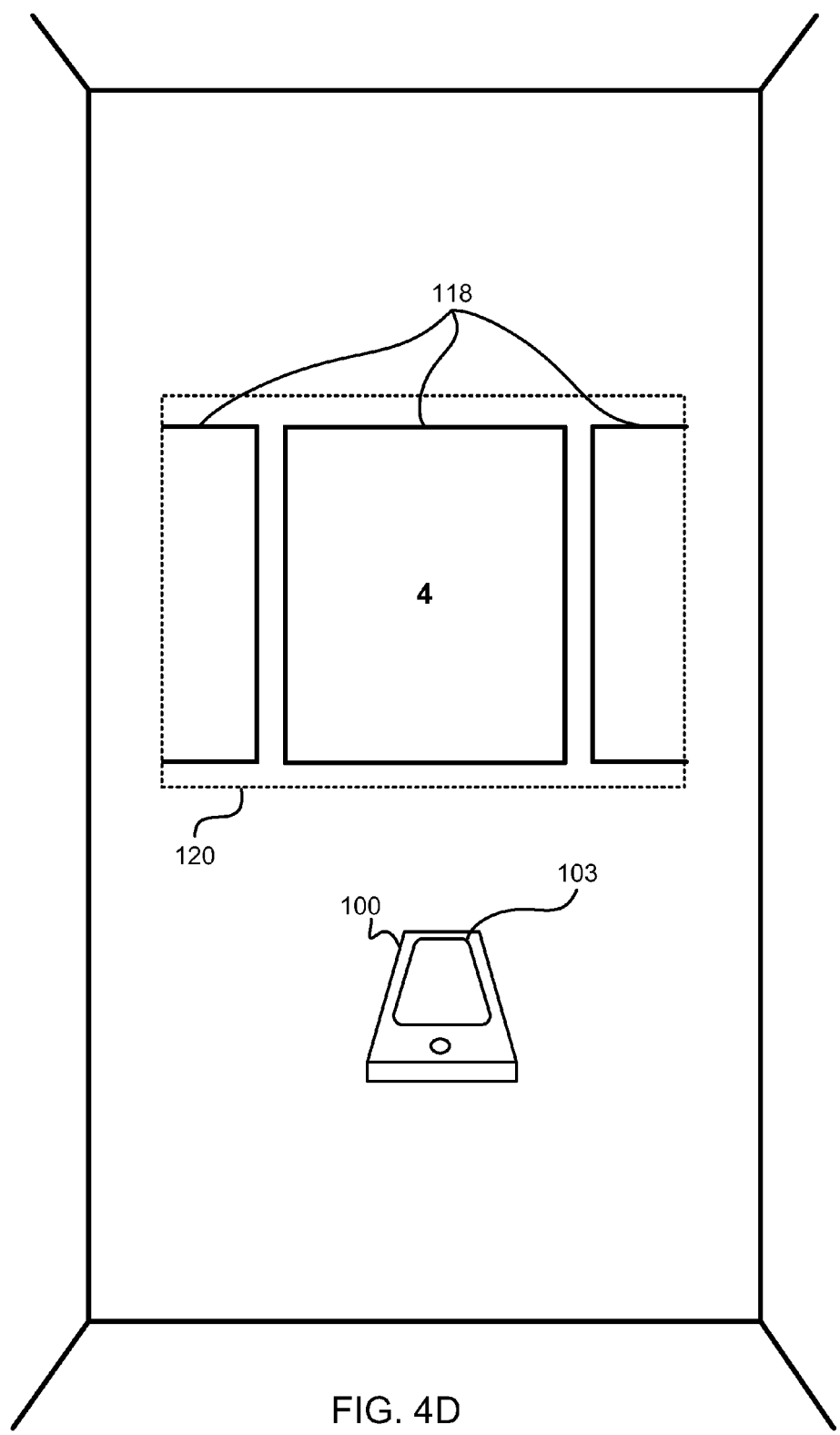
Figure 5A:
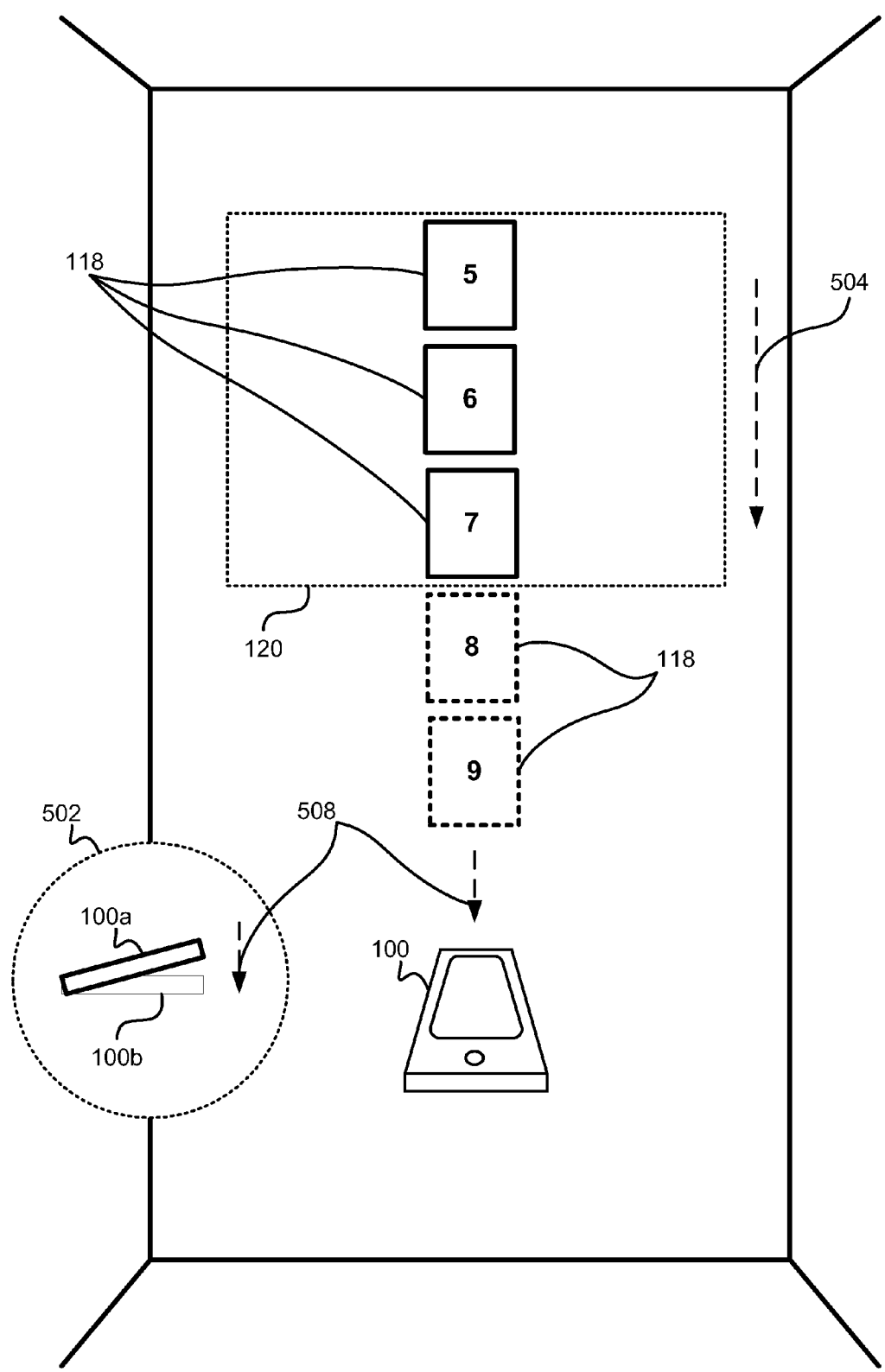
FIG. 5A-5C are illustrations of user interactions with a mobile device via a projected mobile device user interface using hand gestures.
Figure 5B:
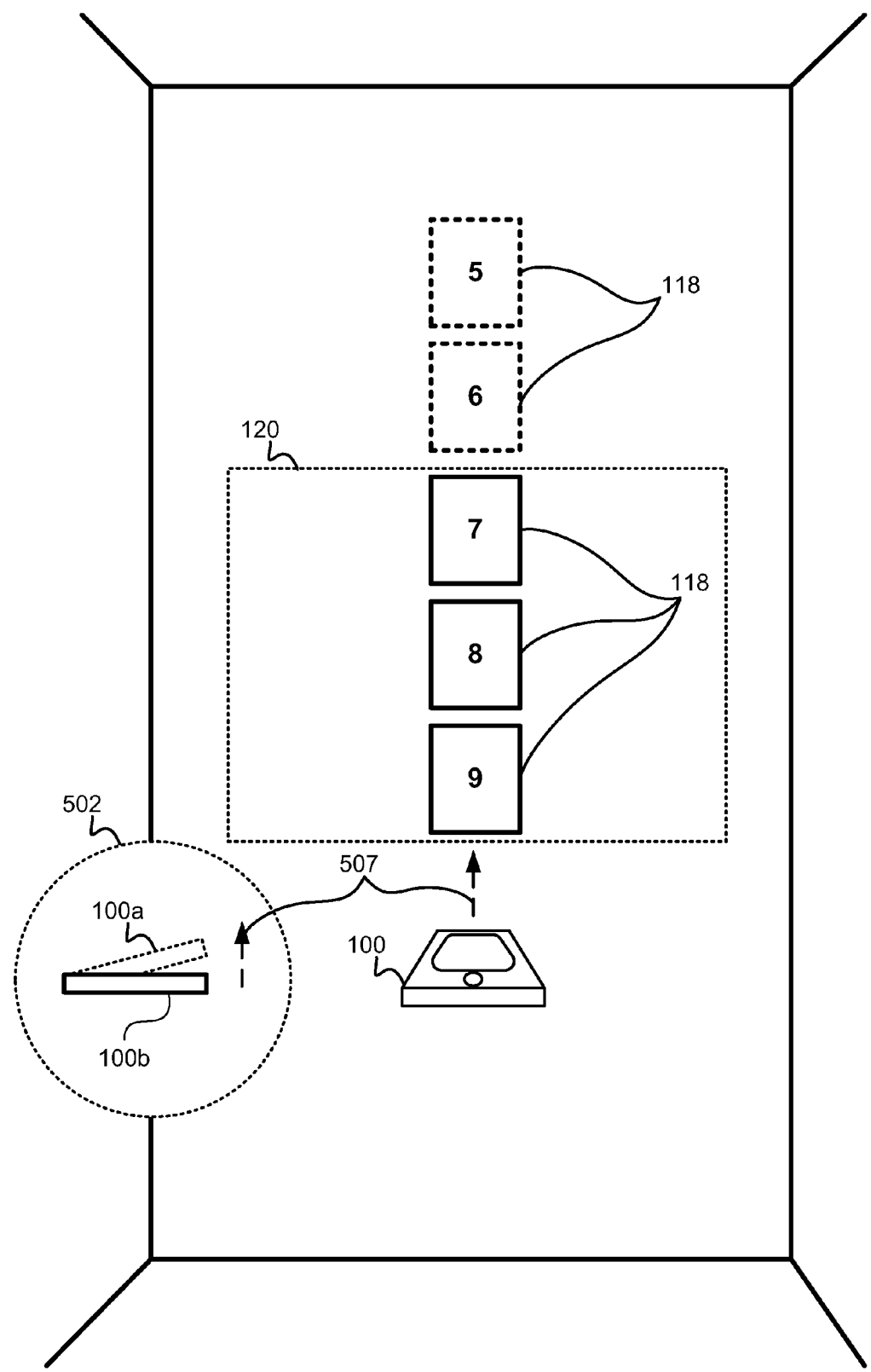
Figure 5C:
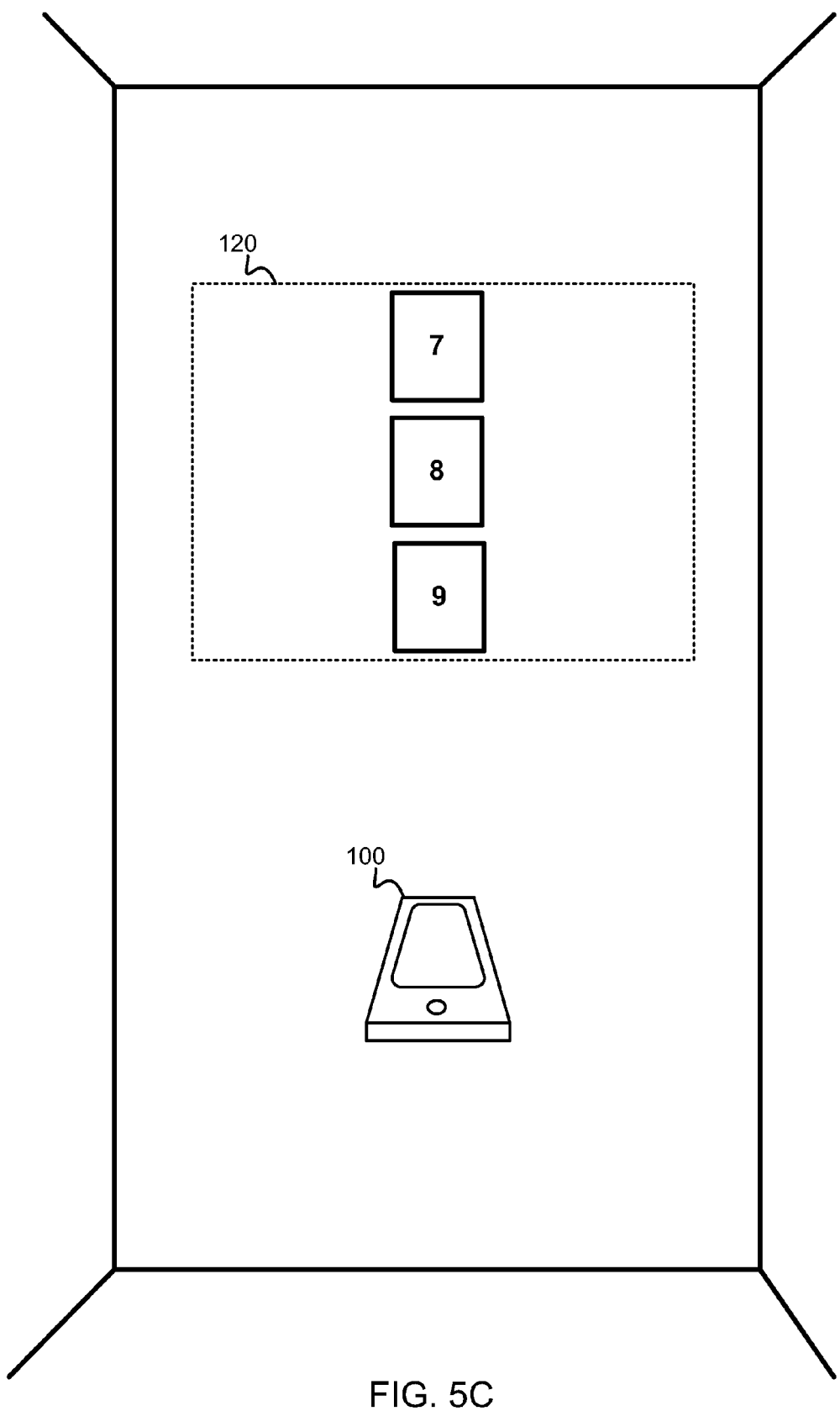

FIGS. 4A through 4D, illustrate an aspect hand gesture suitable for interacting with a list of items displayed in a user interface image in a projected frame 120. Similar to touch gestures, hand gestures enable users to interact with applications or files on the mobile device via the projected user interface. In such aspects, users move the mobile device 100 manner that can be recognized as a user input. For example, while pointing the mobile device 100 at an external surface on which projected images may be displayed, users may move the mobile device 100 from side to side to scroll through the projected contents as illustrated in FIGS. 4A, 4B (or 4C), and 4D. As another example, users may tilt their mobile device up or down to scroll through a vertical list of contents as illustrated in FIGS. 5A, 5B, and 5C. As another example, users may rotate their mobile device in order to affect displayed content, such as to adjust a zoom setting as illustrated in FIGS. 6A-6D, or to scroll through a list or database as illustrated in FIGS. 7A-8B.

In order to enable mobile devices to recognize such hand gestures, they may be equipped and configured with sensors, such as accelerometers and a digital compass which can sense and measure such movements. For example, a mobile device may include three accelerometers, one for detecting accelerations along the "X" axis, another for detecting accelerations along the perpendicular "Y" axis, and a third for detecting accelerations along the perpendicular "Z" axis. When the mobile device 100 is in a horizontal position, the accelerometers may detect the gravity vector based on the relative accelerations measured by the 3 perpendicular accelerometers. For example, when the mobile device is held still and in a horizontal orientation with respect to the surface of the earth, only the "Z" axis accelerometer may sense acceleration while the other accelerometers sense little or no acceleration. If the mobile device is then tilted out of the horizontal plane, this may be detected by an increase in the acceleration sensed by one or both of the "X" and "Y" axis accelerometers and a decrease in the acceleration sensed by the "Z" accelerometer. Also, a rapid movement of the mobile device in any direction may be sensed as momentary accelerations by any one or all of the three accelerometers. Methods for detecting orientations and motions of devices based on accelerometer signals are well known and may be implemented within the mobile device processor as part of the various aspects.

While the user interface image is projected onto an external surface, the mobile device processor may monitor signals received from sensors (e.g., accelerometers and/or a digital compass) to detect movements of the device. As part of this process, the mobile device processor may determine its resting orientation, which may serve as a starting point for detecting and interpreting hand gestures. By determining its resting position, the mobile device 100 may be able to detect and implement a hand gesture to affect the projected contents. At any given position, accelerometers of a mobile device 100 may be able to detect the position of the mobile device 100 based on the forces of gravity.

Other sensors, such as a digital compass, may also be used to detect resting orientations and motions of mobile devices 100. For example, a compass may be used to determine the change in direction in which the mobile device 100 is pointing.

In the various aspects, the projected user interface image may be adjusted in response to detect movements. In some aspects, the projected user interface image may be held fixed with respect to the mobile device, so that as the user manipulates the mobile device, the projection on the external surface moves with it. In other aspects, the projected user interface image may be held fixed with respect to the external surface, such as by means of actuators tied to the projection lens and configured to manipulate the lens so as to study the projection with respect to the external surface. In still other aspects, a processor within the mobile device may be configured to adjust the projected image so that image objects appear fixed with respect to the external surface as the projected frame moves.

In aspects in which the projected image is not adjusted for movement of the mobile device, the projection and images will move in a manner that users will expect, much like how a flashlight beam moves in response to movements of the flashlight.

Figure 18:
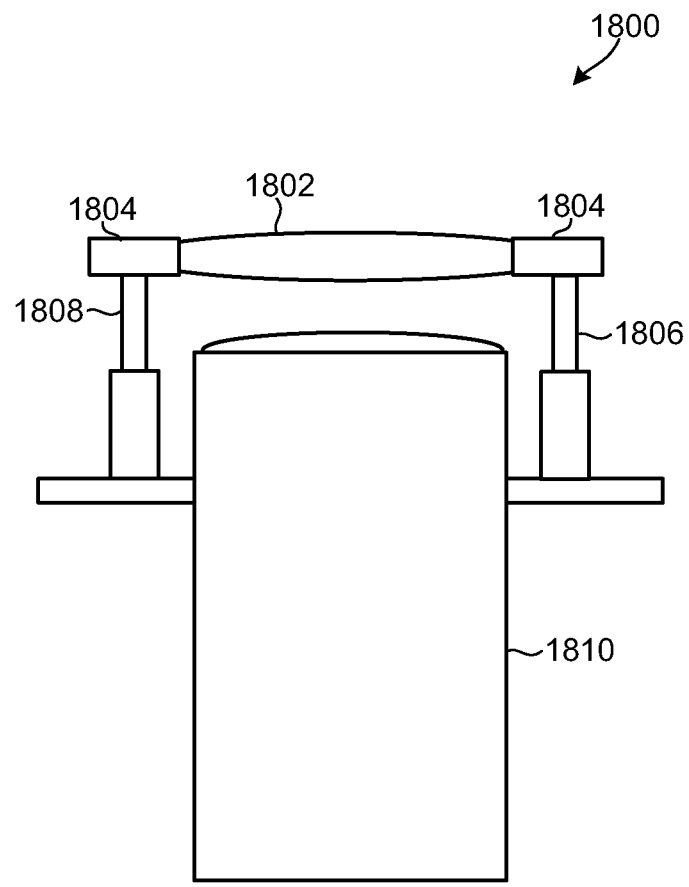
FIG. 18 is a cross-sectional view of a steerable projection assembly which may be implemented with a mobile device according to an aspect.

In aspects in which the projected image is maintained approximately steady on the external surface while the mobile device is manipulated may employ a steerable pico projector (i.e. a projector which can be steered such as by positioning servos) or a pico projector combined with steerable optics, such as illustrated in FIG. 18 and described in more detail below. In such aspects, the mobile device processor senses movements or changes in the orientation of the device while projecting a user interface image on external surface, and steers the projected image in an effort to compensate for such movement. Thus, as a user aims the mobile device to the right, the steerable optics may steer the projection to the left so that the projection remains more or less steady on the external surface. FIGS. 4A-4C illustrate aspect methods using a mobile device 100 equipped with more than one projectors.

Referring to FIG. 4A, a user may perform a hand gesture to scroll through a horizontal list such as by turning the mobile device 100, such as to the right as indicated by dotted arrow 408. The device processor processing signals from accelerometers and/or a compass may detect the change in orientation of the mobile device 100, and steer the projection lens to redirect the projected frame 120 so as to maintain a constant position on the external surface, such as illustrated in FIG. 4B. In alternative aspects which do not include steering of the projection lens, the user interface image may be processed to adjust the position and presentation of image objects consistent with the objects remaining fixed on the external surface as the projection beam moves. This alternative is illustrated in FIG. 4C, which illustrates how as the projection frame 120 shifts to the right, the image objects, including objects 4, 5, and 6 are adjusted so they appear to remain fixed on the surface. Thus, with the projection frame 120 shifted as illustrated in FIG. 4C, image object 4 is no longer visible, image object 5 is clipped so only a portion if visible, and image object 6 is fully visible.

In addition to steering the projected frame 120 (as illustrated in FIG. 4B) or repositioning image objects within the projection (as illustrated in FIG. 4C), the processor may also interpret the device movement as a command to scroll displayed list of image objects 118. Thus, as illustrated in FIG. 4B, the image objects 118 within the projected frame 120 may scroll to the right, such that image object 5 scrolls out of the projected frame 120 to the right while image optic for scrolls into the projected frame 120 from the left. The scrolling of the image objects 118 may continue so long as the user continues to aim the mobile device to the right (or to the left). To stop the scrolling, the user may turn the mobile device 100 back to the initial orientation, such as by moving it back along the dotted line and arrow 407. Thus, when the mobile device 100 is returned to its initial orientation, the scrolling may stop at the currently displayed image object 118 as illustrated in FIG. 4C. In a similar manner, a user may scroll the list in the opposite direction by turning the device in the opposite direction. Also, a similar scrolling of the list may be accomplished in the vertical direction by tilting the mobile device up or down in order to command the device to scroll the displayed image objects up or down while maintaining the position of the projection frame 120 steady on the external surface. In a further aspect, the speed at which a scroll occurs may depend upon the angle that the mobile device is turned from its initial configuration, such as the greater the angle of the turn, the faster the scroll.

In aspects in which image objects are steadied on the external surface even as the projection moves, the processor of the device may be configured to adjust the projected image in response to detected movements of the mobile device. Specifically, the processor may reposition image objects within the projected image so they move within the projected frame in a manner that is equal and opposite to movements of the projected frame on the external surface. Thus, like a flashlight illuminating a tapestry, movement of the mobile device may cause the projected frame to move on the external surface in a manner that reveals image objects above or to the side of its initial position. Such an aspect may enable a user interface that enables users to inspect lists and arrays of image objects by maneuvering the mobile device to reveal them instead of requiring the user to scroll through the objects. FIGS. 5A-5D illustrate aspect methods using a mobile device 100 equipped with one projector.

FIG. 5A illustrates an example in which a vertical list of image objects 118 (i.e., image obvious 5 through 9) extends beyond the area of the projected frame 120. In an initial orientation illustrated in FIG. 5A, the projected frame 120 includes image objects 5, 6, 7, while image object 8 and 9 appear on the list below the area encompassed by the projected friend 120. To review the image objects below those present in the current projected frame 120, a user may tilt the mobile device 100, as shown in a cross-sectional view in insert 502. The result of such a downward tilt from an initial orientation (illustrated as 100a in insert 502) to a new orientation (illustrated as 100b in insert 502) is illustrated in FIG. 5B, which shows the projected frame 120 and a new, lower position on the external surface. In this new orientation, image objects 7, 8, and 9 are included in the projected frame 120, while image objects 5 and 6 are no longer visible as lying (virtually) above the displayed portion of the list. Once the user has panned the projected frame 120 to reveal a desired portion of the list of image objects 118, the user may execute another command, such as the pressing a button (e.g., arrow keys) or tapping of the touchscreen to lock the projected user interface image so that the projected frame 120 may reposition of the external surface without further movements of the displayed image objects. This is illustrated in FIG. 5C, which illustrates an end condition in which a user has selected image objects 7, 8, and 9 by performing the downward tilt hand gesture illustrated in FIGS. 5A and 5B, locked the projection on the new list location and then move the mobile device 100 to reposition the projected frame 120 on the external surface. The locking of the projected user interface image may alternatively occur when the user begins to move the mobile device 100 back to its original orientation 100a. Thus in this example aspect, a downward tilt causes the list to scroll and a vertical manner, stopping when the user returns the mobile device to its original orientation. To scroll the list in the opposite direction (e.g., downward), the user may tilt the mobile device 100 a few degrees. While FIGS. 5A-5C illustrate a hand gesture involving a vertical (i.e. up or down) tilt, similar functionality may be ascribed to left or right turns of the mobile device. In a further aspect, the speed of the vertical scroll may depend upon the angle of the tilt, such as the greater the tilt, the faster the scroll.

Figure 6A:
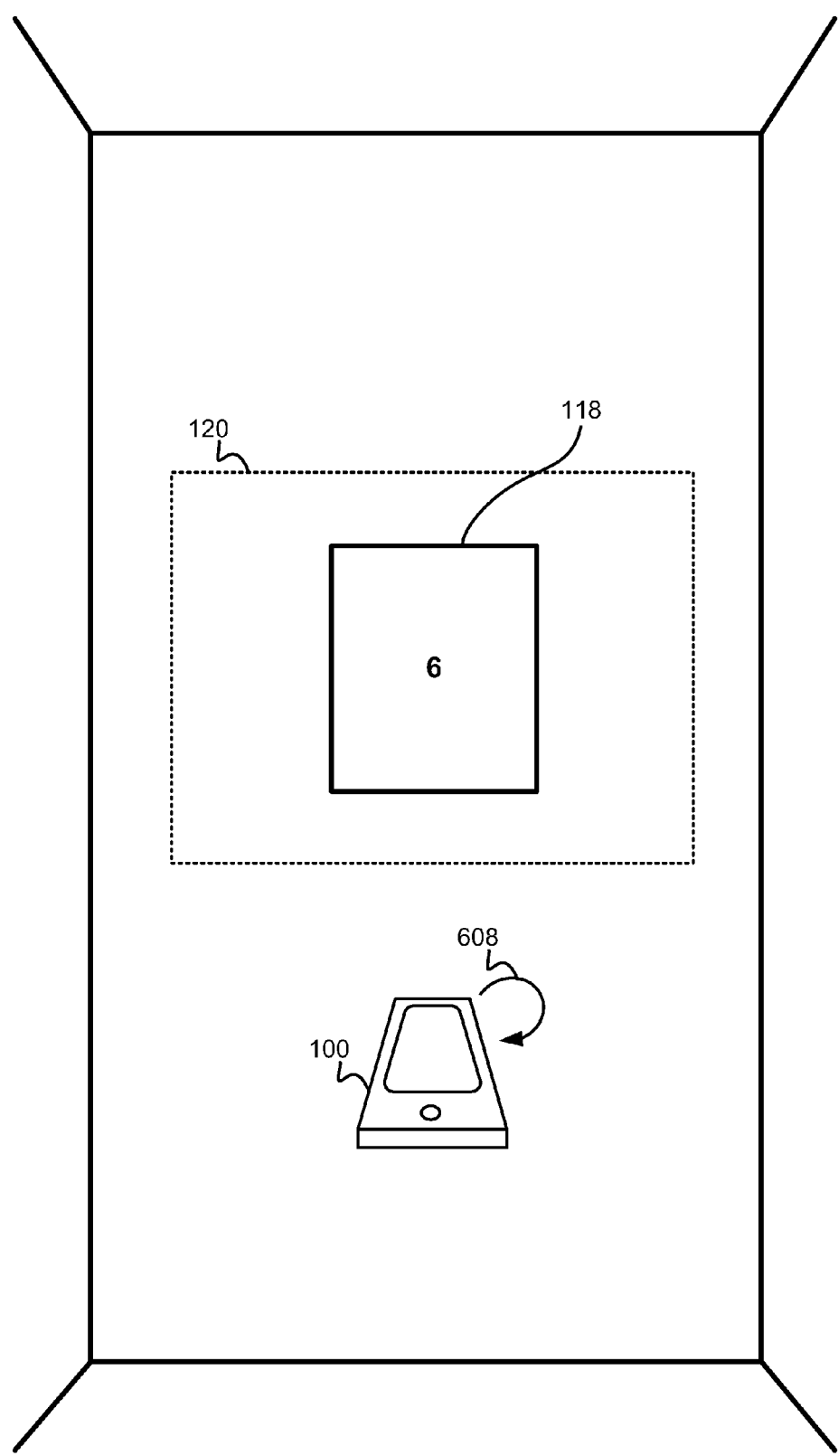
FIGS. 6A-6D are illustrations of user interactions with a mobile device via a projected mobile device user interface using hand gestures.
Figure 6B:
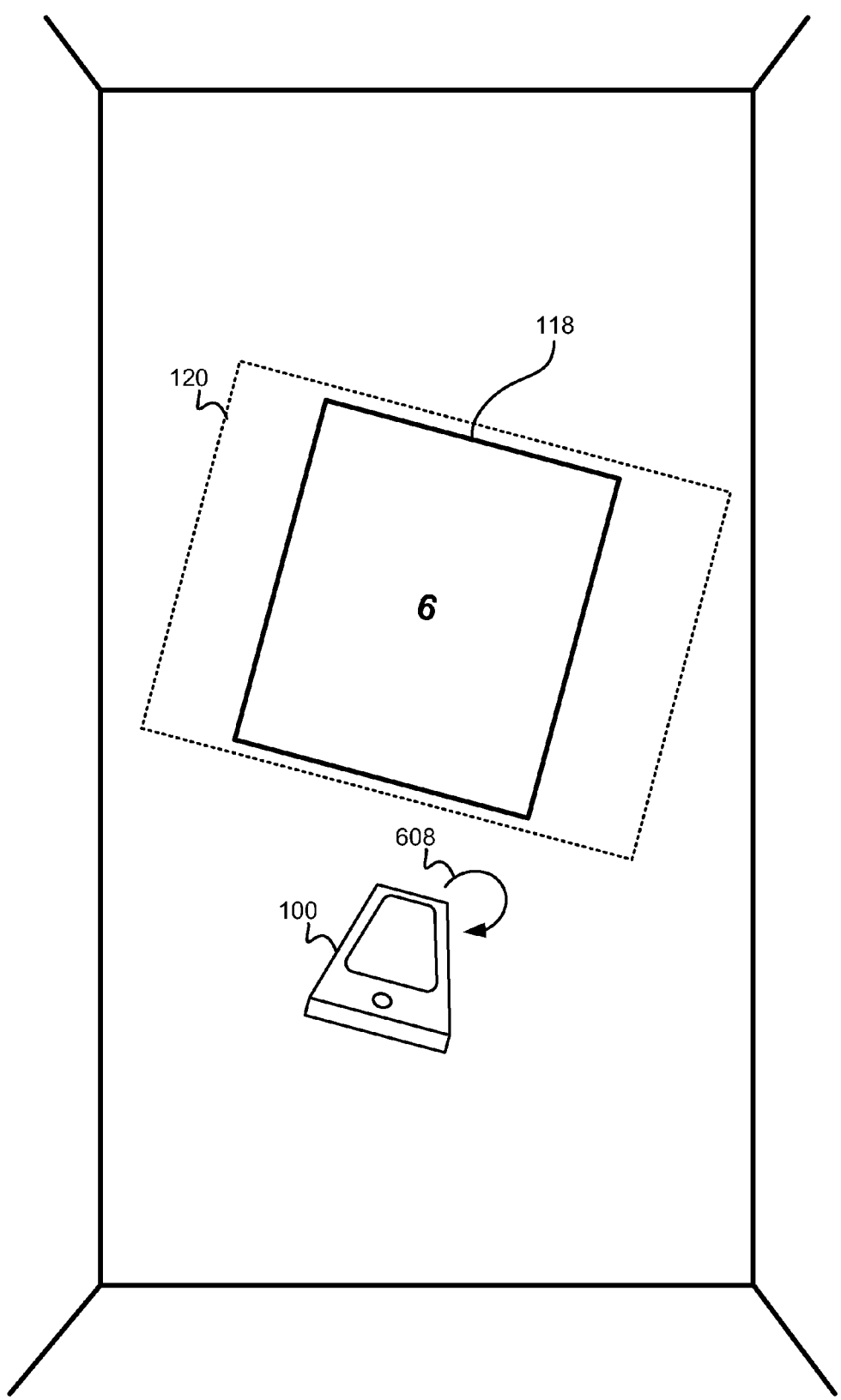
Figure 6C:
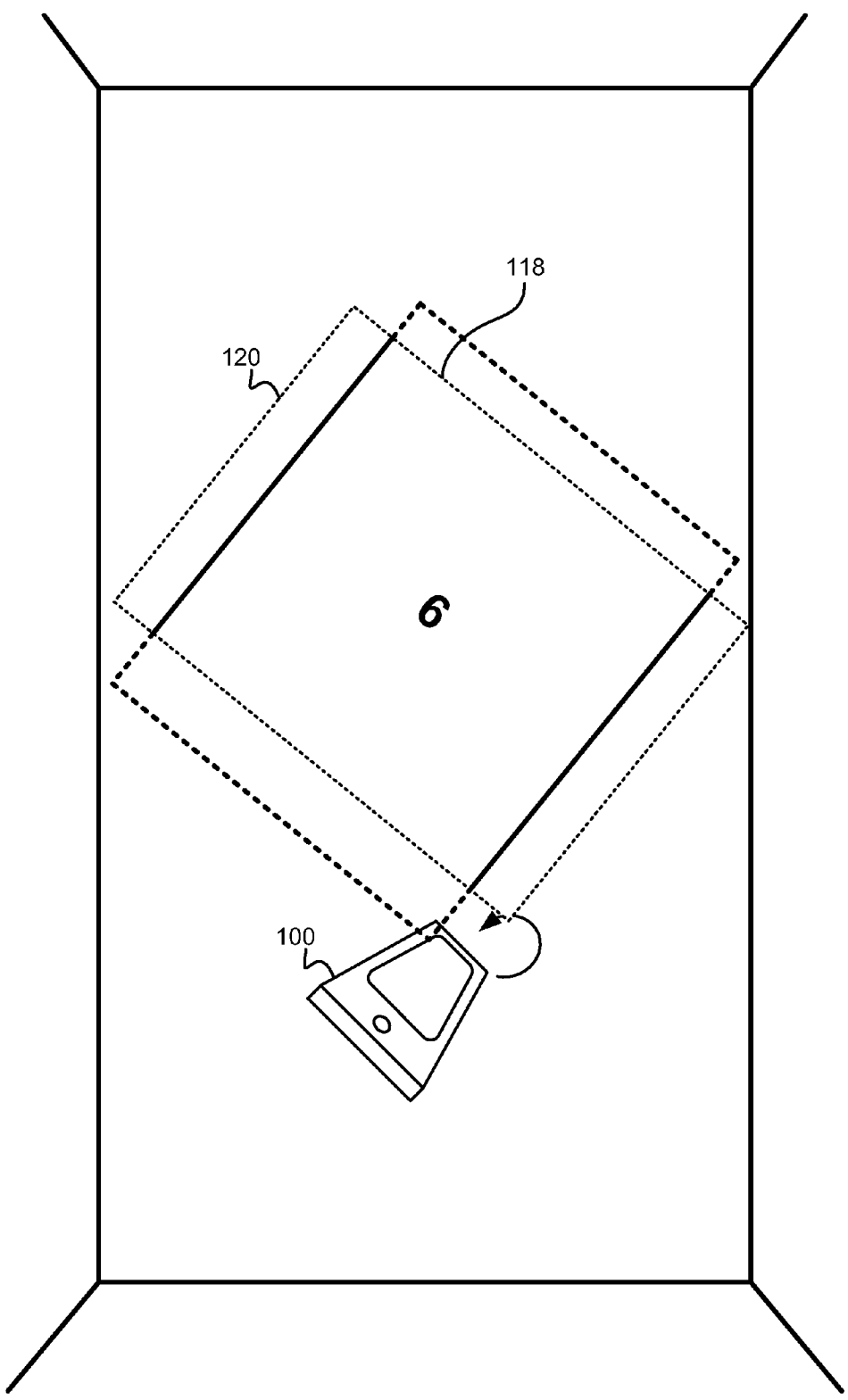
Figure 6D:
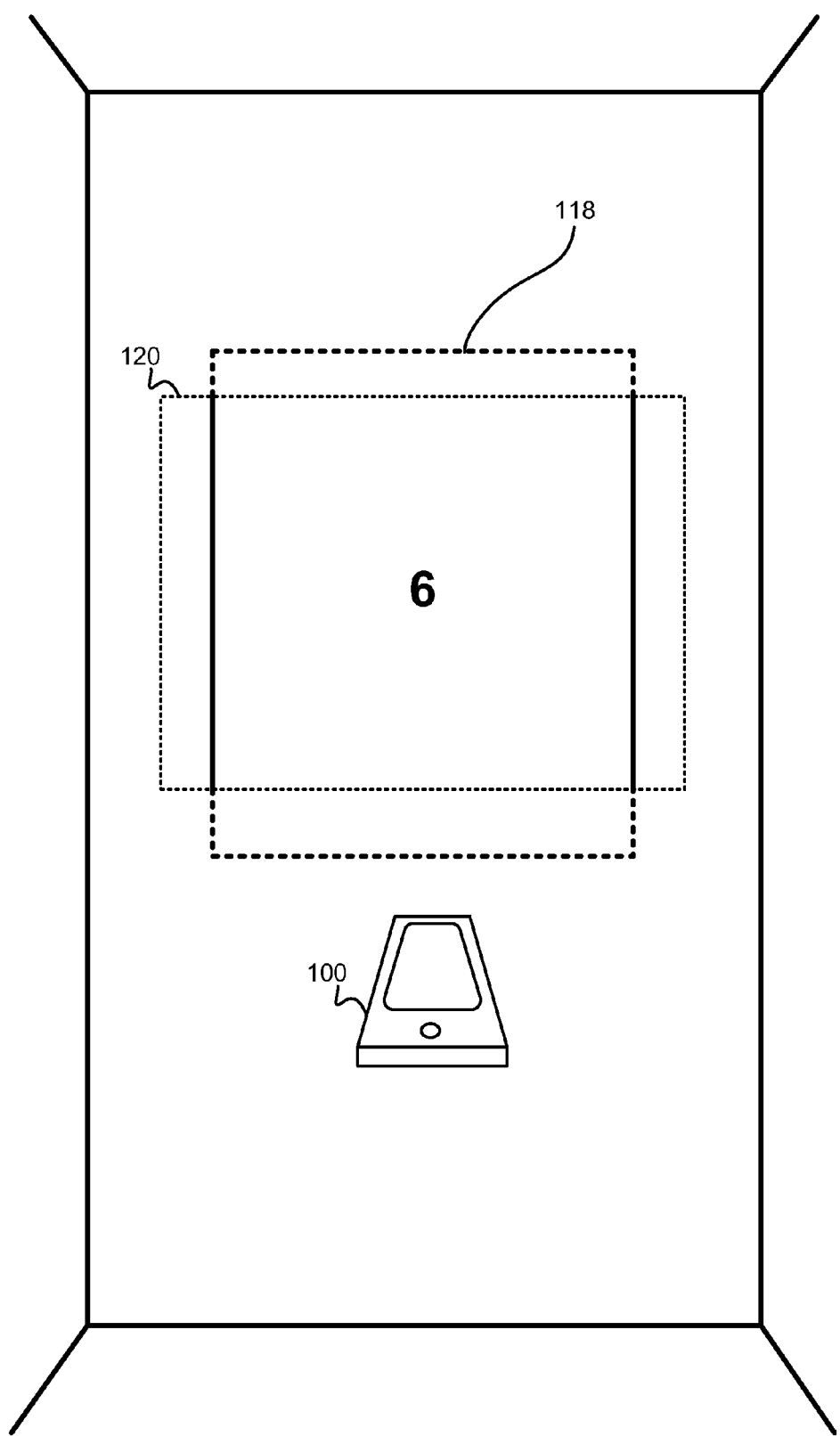

Other hand gestures may also be used to implement functionalities other than list scrolls when interacting with projected user interface displays. In an exemplary aspect shown in FIGS. 6A-6D, the mobile device may be configured so that a rotating hand gesture may be used to control the zoom factor of projected user interface images. As illustrated in FIGS. 6A and 6B a user may perform a zoom-in hand gesture by rotating a mobile device 100 from its initial orientation shown in FIG. 6A to the right (for example) in the direction of the line and arrow 608 to its second orientation shown in FIG. 6B. In response to this hand gesture, the displayed image object 118 within the projected frame 120 is increased in magnification as shown in FIG. 6B. In this aspect, the mobile device 100 may detect the angle of rotation of the mobile device, such as based upon signals received from accelerometers, determine the angle of the new orientation, determine a zoom factor or rate of increase/decrease of zoom to apply to projected images based upon the determined angle, and adjust the projected user interface display by applying the determined zoom factor to the projected image. Thus, as illustrated in FIG. 6C, the larger the angle of rotation (or the longer the rotation is maintained), the greater the zoom factor applied to the image and the larger the image appears. When a desired image zoom factor or image size is achieved, the user may lock the current zoom factor, such as by touching a button (e.g., arrow keys) or touchscreen or by rotating the mobile device back to the initial orientation (e.g., horizontal), as illustrated in FIG. 6D. To reverse the change in the applied to zoom (i.e., zoom out), the user may rotate the mobile device in the opposite direction (e.g., rotating it to the left) which will cause the mobile device processor to apply a zoom factor in a similar manner.

In various aspects, other user input, such as voice commands, may also be used to interact with the projected user interface. For example, a mobile device 100 may be configured to recognize user saying "zoom-in" as a command to magnify the projected image, which then will be reflected in the projected user interface image.

Figure 7A:
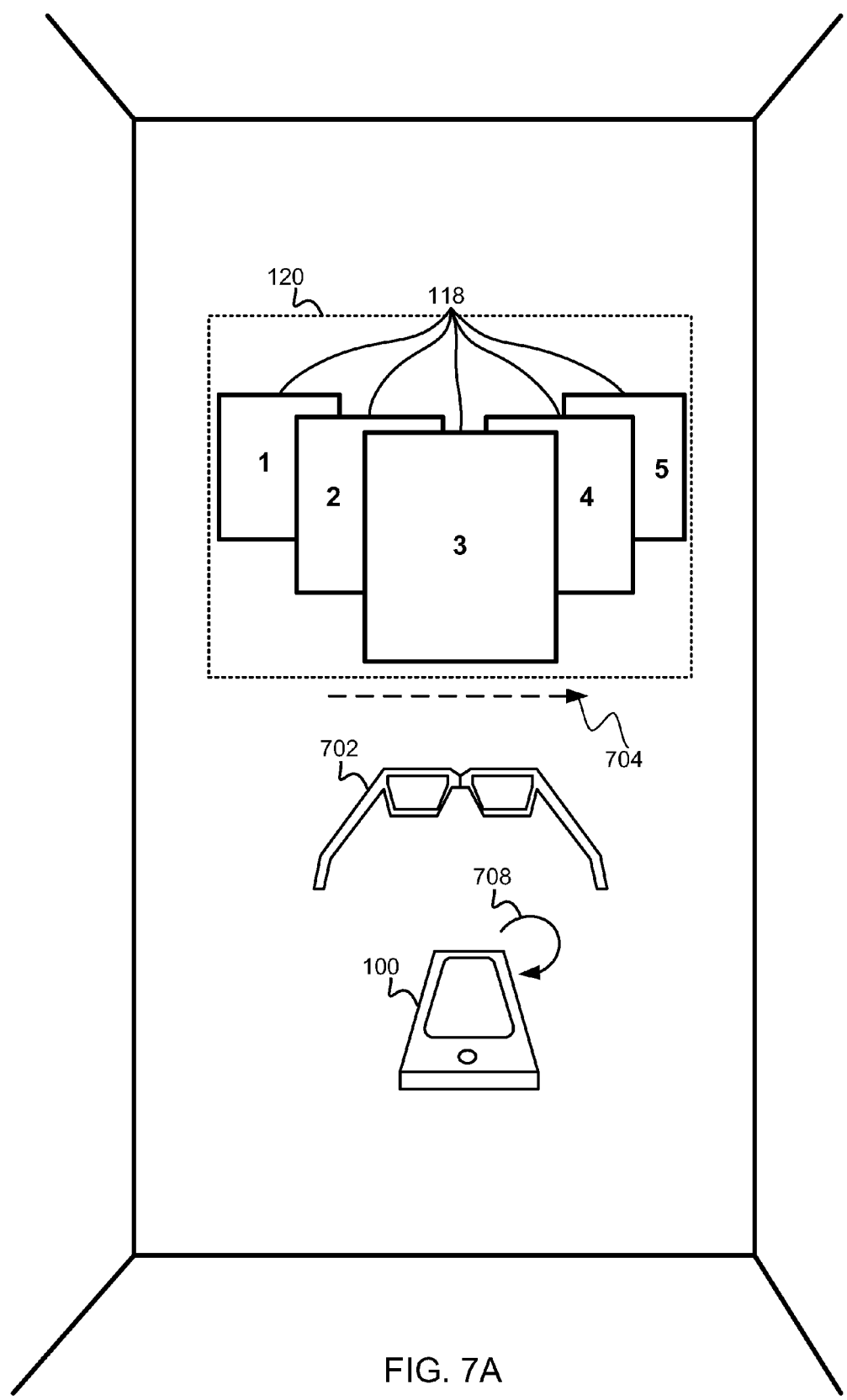
FIGS. 7A-7B are illustrations of user interactions with a mobile device via a 3D projected mobile device user interface using hand gestures.
Figure 7B:
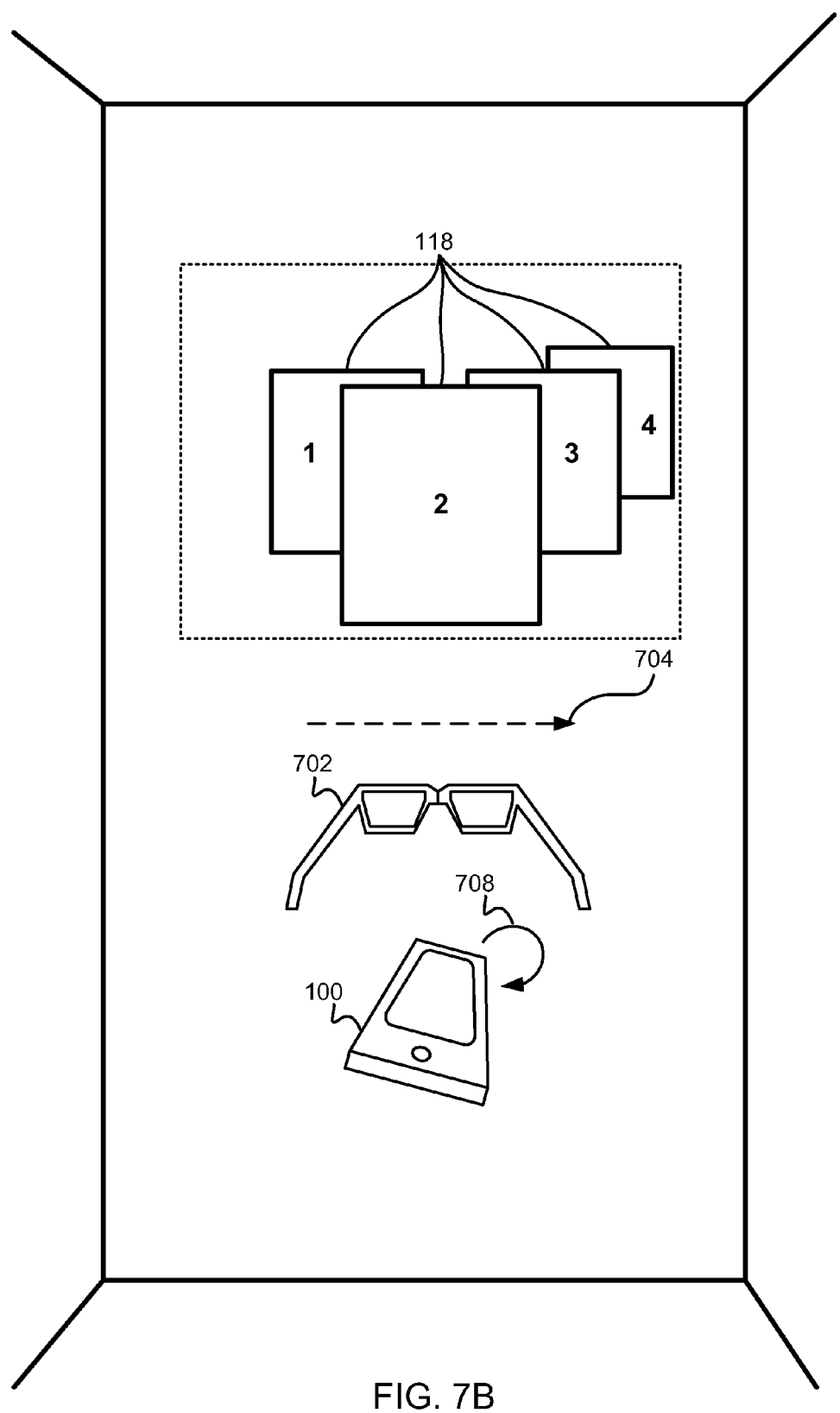

The new capabilities enabled by the various aspects may enable new types of interactions with files and applications executing on a mobile device. FIGS. 7A and 7B illustrate an example of a new user interface display in which the mobile device 100 projects a three dimensional (3D) image on an external surface and enable a user to interact with the 3D image using hand gestures executed on the mobile device.

The creation and projection of 3-D images is well now known, and the user may view the projected image in 3-D by wearing special 3-D glasses 702. In addition to such true 3-D image generation, simulated 3-D images may also be used in the various aspects. Methods for generating a 3-D projection are well-known, such as recently demonstrated in the release of the movie Avatar. Also, technique used to generate a simulated 3-D image on a display screen may be used for generating a projected image that is rendered by a pico projector. In one method, two separate images intended for the left and right eye are generated, one image intended for the left eye and the other intended for the right eye, and the two images alternatively projected for short durations. 3-D glasses 702 are equipped with electronic light filters which alternatively block each eye in synch with the projection. The perceived result is the projected image is seen as being three dimensional. Thus in this aspect, the processor of the mobile device 100 generates two versions of the projected user interface image, one with image objects positioned within the projection frame for the left eye and the other positioned with image objects positioned within the projection frame for the right eye, with the position of objects in the foreground shifted between the left and right images more than for image objects in the background. The generation of two images may be facilitated by providing two display buffers (e.g., left and right image buffers) within the processor or image rendering circuitry of the mobile device so two images can be alternatively projected simply by alternatively drawing from the left and right image buffers. In a further aspect, the mobile device may be equipped with two pico projectors, with one used to project images for the left eye and the other used for projecting images for the right eye. In such a configuration, the pico projectors may be alternatively energized or alternatively masked, such as with an electrically activated light filter in a manner similar to how the 3-D glasses 702 operate. In a further aspect, the processor of the mobile device 100 may be configured to communicate with 3-D glasses 702, such as via a BlueTooth, WiFi, Zigbee, NFC or other wireless data link, to synchronize the active light filters in each lens with the projectors of the mobile device.

In a 3D projected user interface image, a row of image objects 118 may be shown, with a currently selected image object (shown as image object 3) positioned in the foreground with the rest of the image objects 118 at various distances in the background. This aspect, the scrolling (shown by arrow 704) of the image objects 118 in response to a rotational hand gesture 708 may appear as if the images march forwards towards the center and then march backwards away from the center. Thus, after one scroll increment the projected user interface image may appear as illustrated in FIG. 7B.

Figure 8A:
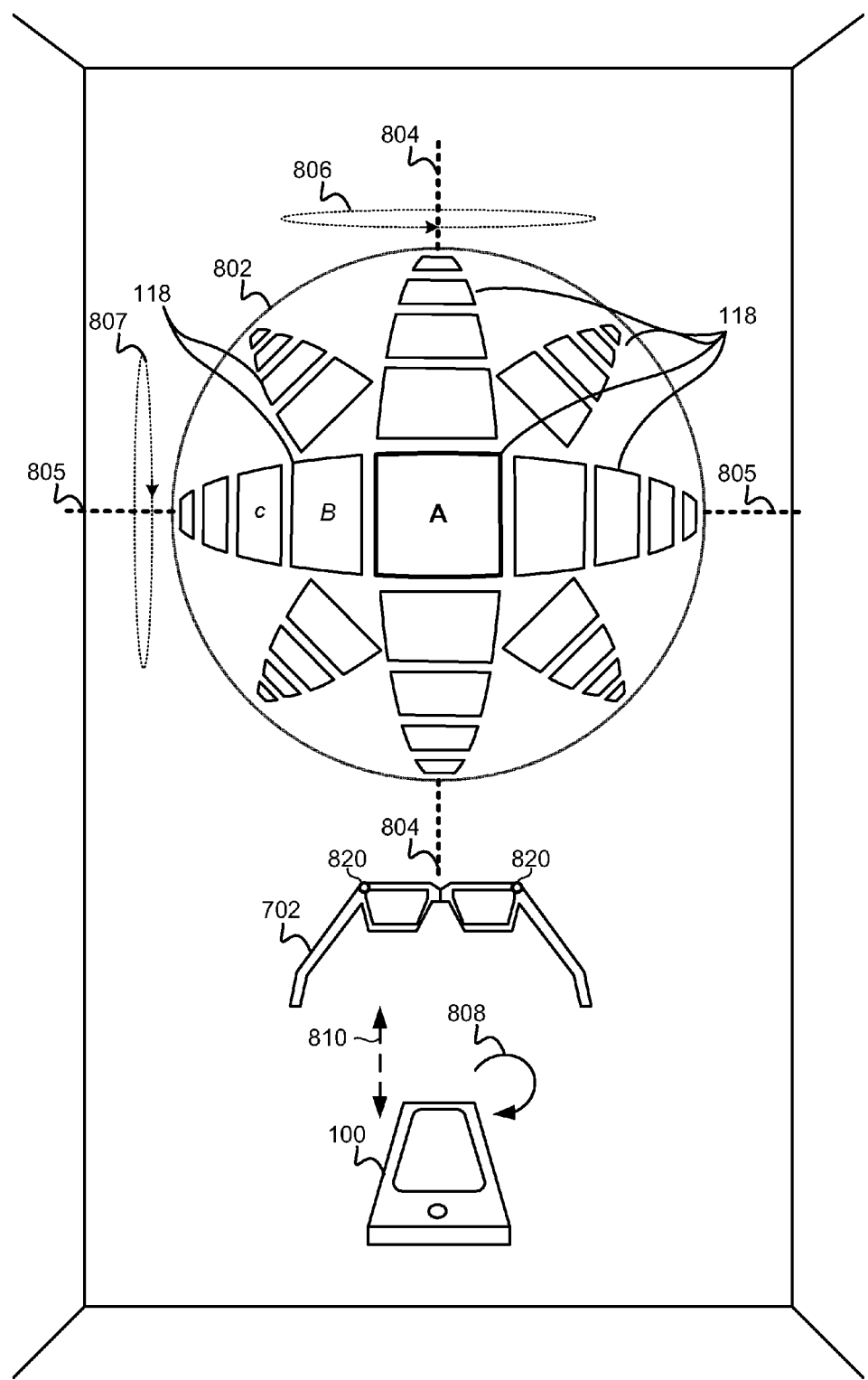
FIGS. 8A-8B are illustrations of user interactions with a mobile device via a 3D projected mobile device user interface using hand gestures.
Figure 8B:
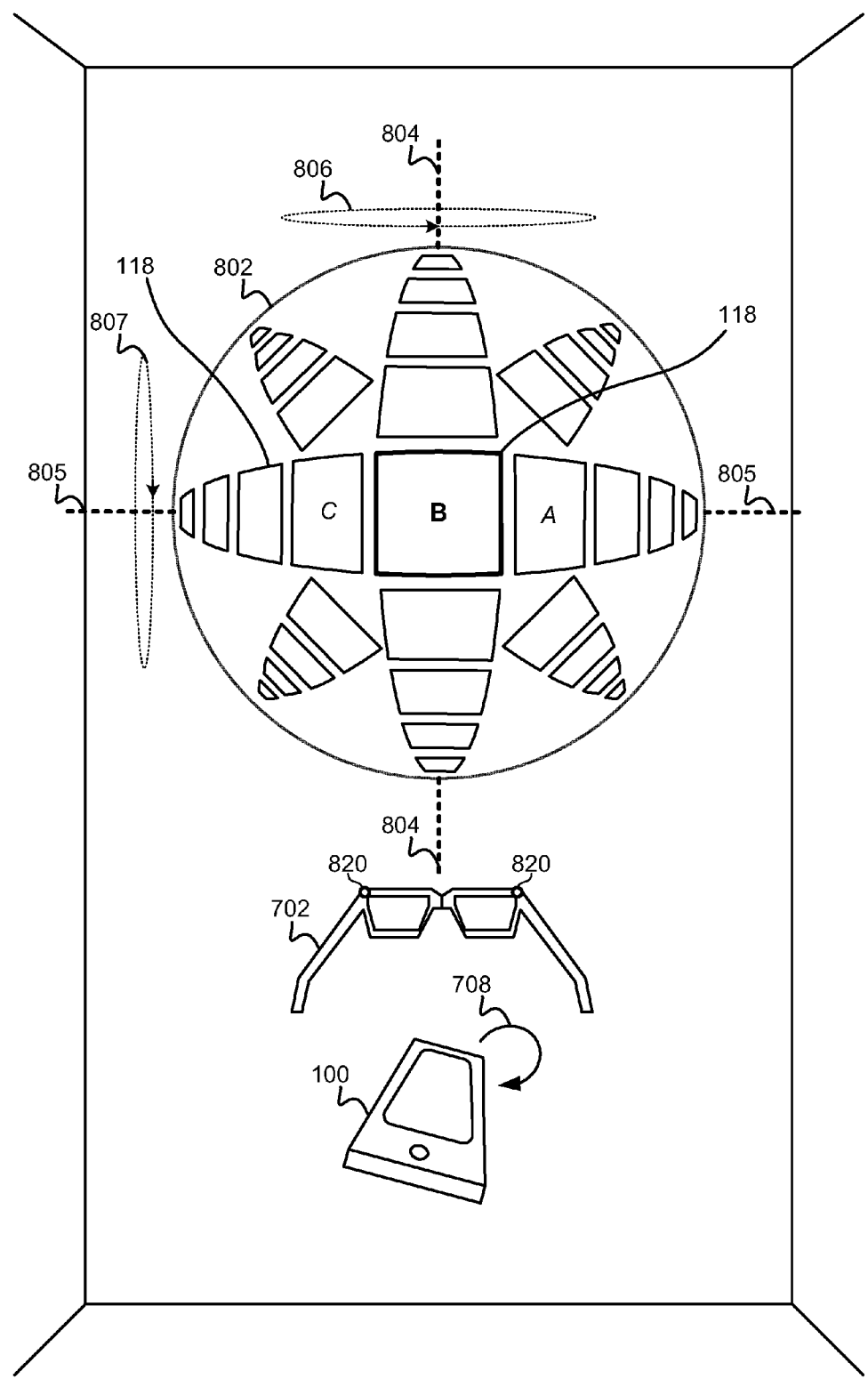

Another new user interface enabled by the capabilities of the various aspects is a spherical array of data rather than a flat list or two-dimensional array as illustrated in FIGS. 8A and 8B. In this aspect, a mobile device 100 may project 3-D user interface image or an external surface which will appear, with the aid of 3-D glasses 702, in the shape of a sphere or globe 802. As illustrated in FIG. 8A, the mobile device 100 may project user interface image made up of many image objects 118, such as objects in a database, that appear in a spherical arrangement when viewed with 3-D glasses 702, such as glued to the surface of a large virtual globe 802. In such a projected user interface image, the central image object (A) may be the currently selected or selectable object. To view or select other objects in the accessed database, a user may manipulate the mobile device 100, such as by rotating (808) or tilting (810), which the mobile device processor uses as commands to rotate the sphere in the desired direction, so as to present the next image object (B) in the direction of rotation as the selected or selectable object.

In this aspect, a user can rapidly move through a large database by causing the virtual globe 802 to rotate about the vertical axis 804 (as shown by dashed arrow 806), about the horizontal axis 805 (as shown by dashed arrow 807), or both simultaneously by appropriately rocking and pivoting the mobile device. Due to user familiarity with round surfaces, such as globes and bowling balls, this user interface enabled by the various aspects may prove intuitively easy to use and efficient for locating objects within an extensive database. Thus, users may "roll" through a database rather than "scroll" through lists of data. The position of objects on the virtual sphere may be tied to data relationships organizations, in a manner similar to how cities are position within countries and countries are position within continents on a globe. Further, the virtual size of the globe 802 may be adjusted to that which is necessary to contain all the images on its surface. Thus, a globe presenting 12 image objects on its surface would be much smaller than a globe presenting 10,000 image objects on its surface. Alternatively, the size and/or spacing of image objects may be adjusted in order to fit all items in a selected database on the globe's surface. This alternative would allow for the same globe size to be used for presenting a database of 12 images and a database of 10,000 images.

To allow users to efficiently interact with the contents displayed in a spherical 3-D user interface projection, the mobile device 100 may also be configured to recognize touch gestures. In the case of touch gestures, a user may use their fingers to interact with a database globe 802 by tracing touch gestures on the mobile device 100 touch screen display, in a manner that appears to enable them to push the sphere in different directions with a finger.

In a further aspect, users may interact with 3D images by using 3D glasses 702 equipped with sensors 820 that can track eye movements. In this aspect, the mobile device 100 may be configured to receive eye movement data detected by eye-tracking sensors 820 in the 3D glasses 702 and interpret eye movement as commands for interacting with the projected display. For example, if a user looks at a particular image object projected on the sphere, the position of the user's eyes may be determined by the eye-tracking sensors 820 and communicated to the mobile device 100, which may interpret the eye position as a user input command to roll the projected contents to bring that image object into the center of the projected image. The mobile device 100 may then execute this command by adjusting the projected user interface image to generate an animation of the globe rolling until the item focused on by the user is centered in the projected image. In an aspect, sensing of the position of the user's eyes can provide a closed loop control system for image movements, since the user's eyes will track an image object as it moves in the projected image. For example, the speed of animation of the projected user interface image may be correlated to the angle of the user's gaze from straight ahead. In this manner, the projected image may be rotated rapidly when the user looks at an image object near the periphery of the projected image (e.g., on a side of a database globe 802), and slow as the image object of interest rotates closer to center (i.e., straight ahead through the 3-D glasses 702). Thus, this embodiment may provide a highly intuitive user interface that requires virtually no training to use.

Figure 9A:
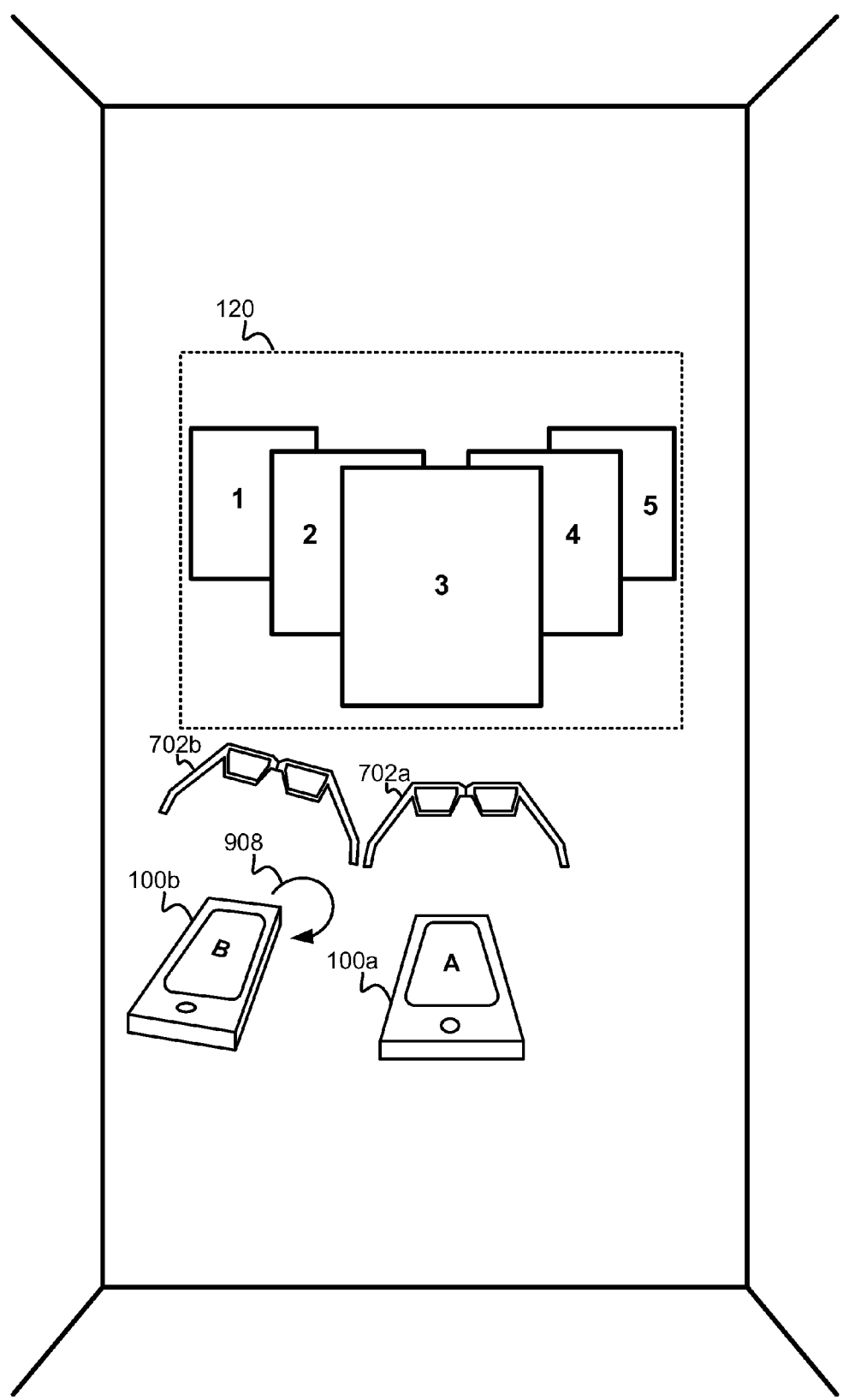
FIGS. 9A-9B are illustrations of user interactions with a mobile device via a projected mobile device user interface from a second mobile device using hand gestures.
Figure 9B:
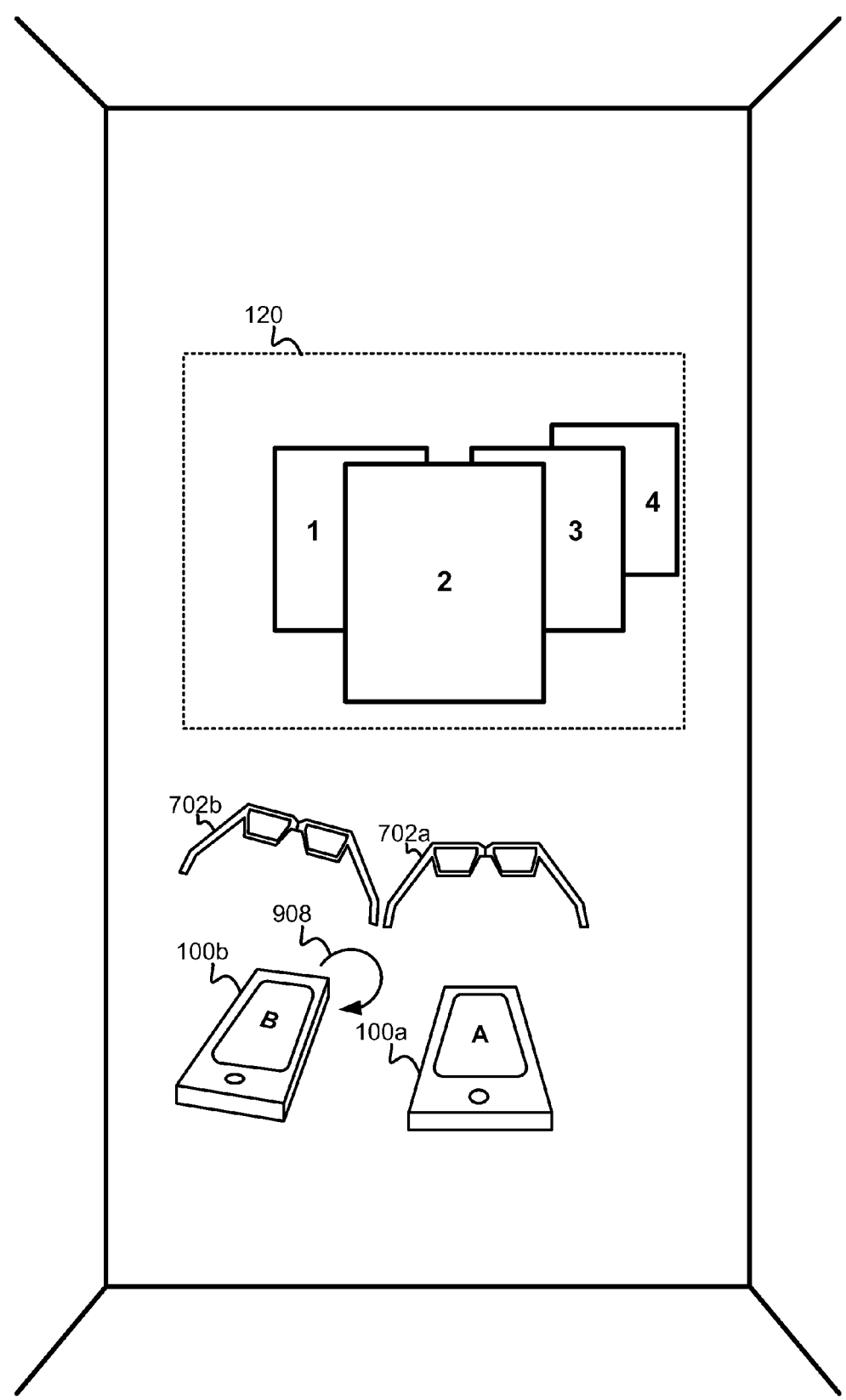

In a further aspect illustrated in FIGS. 9A and 9B, more than one mobile device 100 may be configured to interact with a projected user interface. In this aspect, a first mobile device 100a may project the user interface display onto an external surface. This projected user interface image may be displayed in 2-D or 3-D in the projection frame 120. A second mobile device 100b may be equipped with a wireless data link that can communicate with a first mobile device 100a, such as a Bluetooth communication link. In this manner, users of the second mobile device 100b may implement user interface gestures, such as a rotation of the mobile device (as indicated by arrow 908), with the resulting user interface commands being passed to the first mobile device 100a so that it can reflect the changes in the projected user interface display. In the case of a 3-D projected image, users of both mobile devices may wear 3-D glasses 702a, 702b to enjoy the benefit of the 3-D user interface. For example, in FIG. 9A the second mobile device 100b is rotated to the right as shown by arrow 908. This user input is communicated to the first mobile device 100a, which causes the displayed 3-D list to scroll as illustrated in FIG. 9B.

A wide variety of user interactions they be enabled by multiple mobile devices equipped to communicate user interface gestures corresponding to the projected user interface of the various aspects. In one example, a user may drag a finger across the touchscreen of the second mobile device 100b, which communicates the position of the user touches on the touchscreen to the first mobile device 100a, which then projects a bright light within the projected frame 120 in position corresponding to the touch location on the second mobile device. Such a bright light may function as a virtual laser pointer, enabling a user of the second mobile device to participate in a presentation projected by the first mobile device. A number of mobile devices may cooperate in such a system, with each device being associated with a different color virtual laser spot. Mobile devices not equipped with touchscreens may also cooperate in a similar manner by communicating user inputs received via button presses, such as presses of arrow keys, to control virtual laser pointers.

In another aspect, the second mobile device may be equipped with a camera (see FIG. 17) which may take a digital photograph of the projected user interface image. Enabling imaging of the projected user interface by other mobile devices, may enable completely new forms of interactions among mobile devices and users.

When enabling users to employ hand gestures to interact with projected content, a mobile device 100 may be configured to allow the users to navigate through the contents of the projected display and selection particular items, objects or files. Selection of items when using hand gestures to navigate through a projected user interface may be accomplished using variety of methods. For example, a two phase approach may be used when selecting items using hand gestures. In such a two phase approach, a mobile device 100 may highlight an item, such as by scrolling into the foreground, and a user may select the highlighted item, such as performing another user gesture (e.g., pressing a button, tapping the touchscreen display, shaking the device, etc.).

Figure 10:
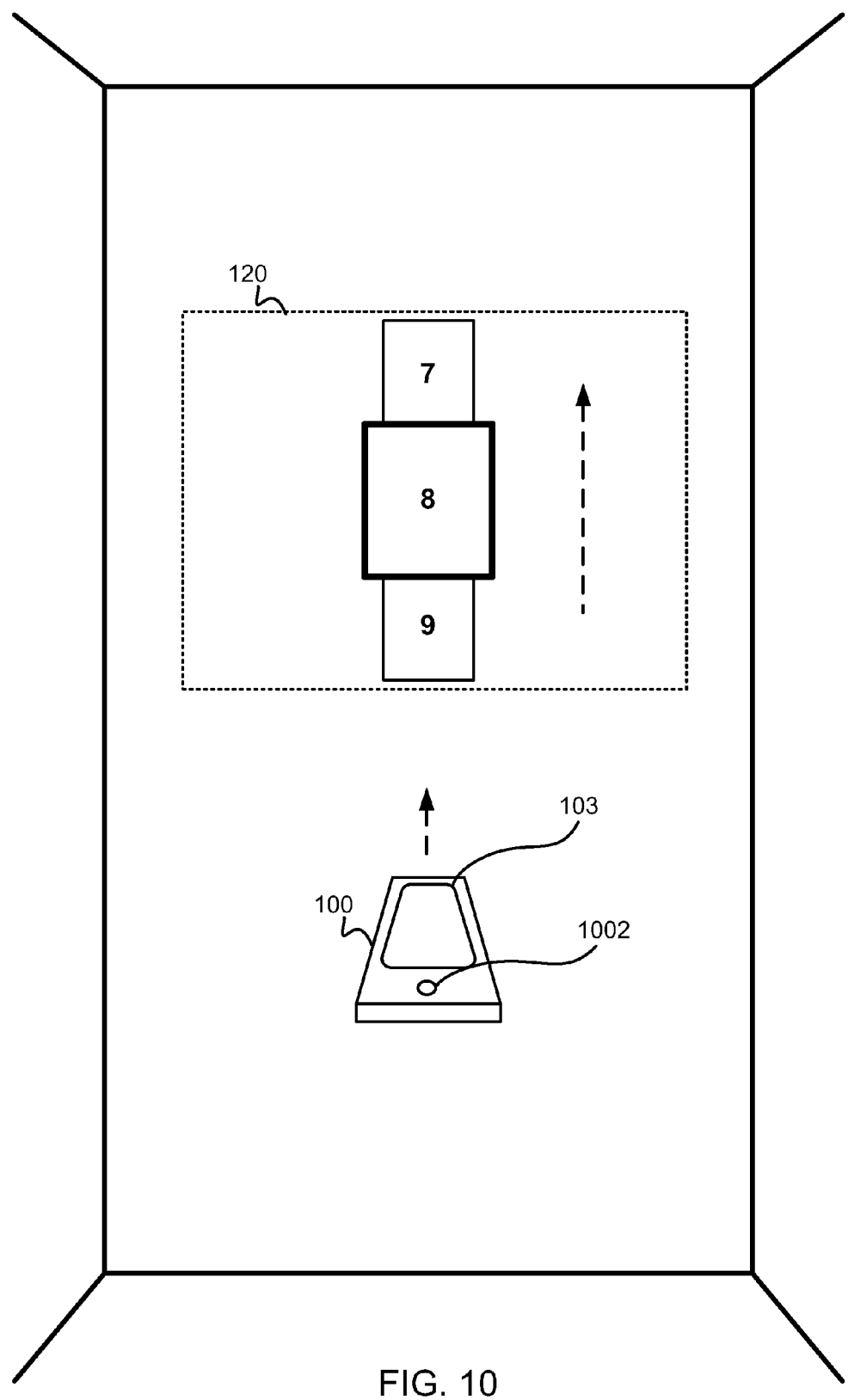
FIG. 10 is an illustration of a user interaction with a mobile device via a projected user interface using hand gestures to select content.

In an aspect illustrated in FIG. 10, a mobile device 100 may be configured to automatically highlight projected contents that appear in particular portions (e.g., the center) of the projected user interface image. For example, the mobile device 100 may be configured to automatically highlight any image object 118 that is presented in the center of the projected frame 120. Thus, the mobile device 100 may be configured to highlight the center image object 118 as the user scrolls up or down through a column of projected image objects 118. To select the highlighted object, a user may perform a second command, tracing a touch gesture on the touch screen display 103, pressing a function button 1002 on the mobile device 100, or performing a hand gesture on the mobile device 100. For example, when image object 8 is highlighted projected user interface image, the user may tap the touch screen display 103 to finalize or confirm the selection.

Figure 11A:
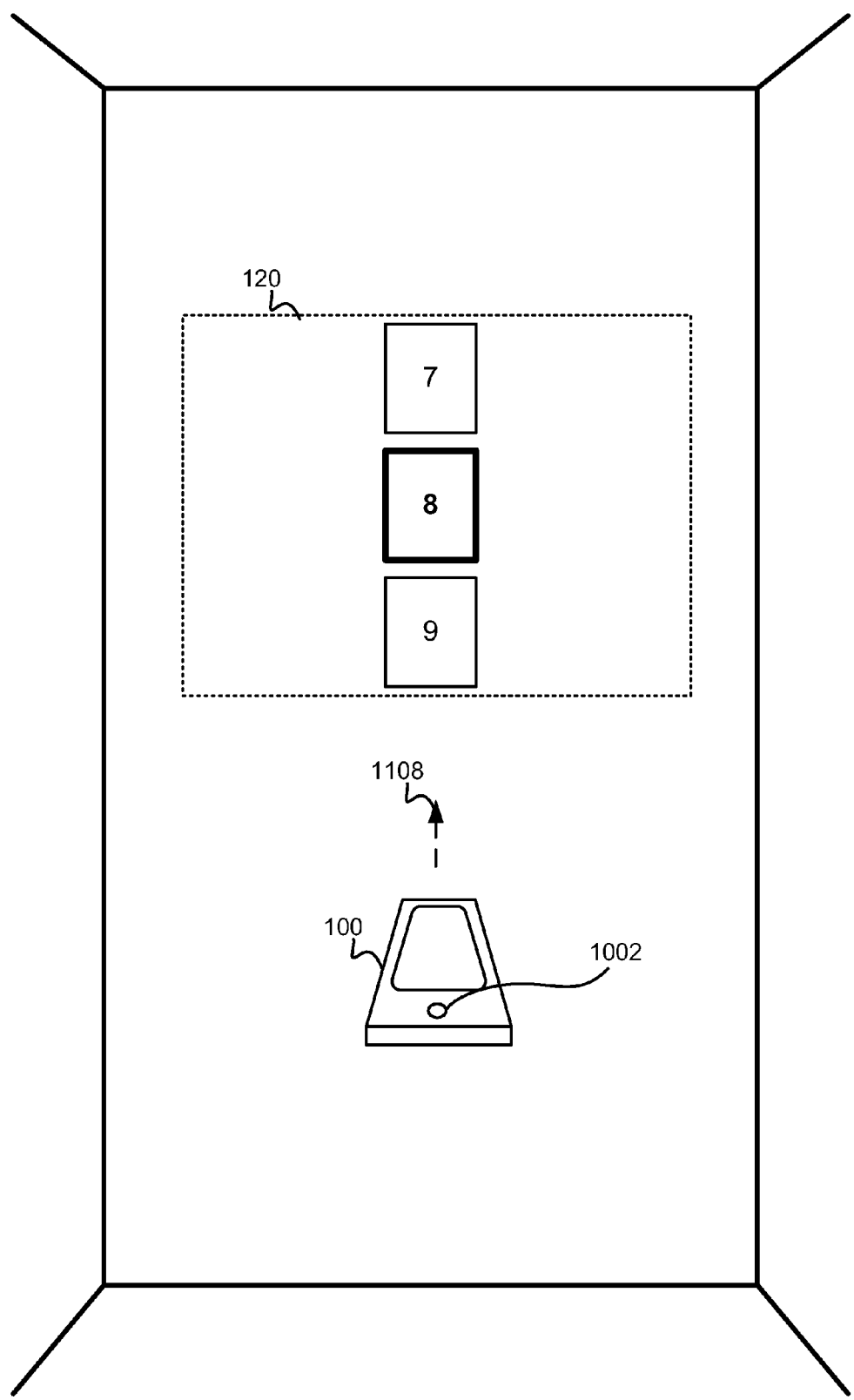
FIGS. 11A-11B are illustrations of user interactions with mobile device via a projected mobile device user interface using hand gestures to select contents.
Figure 11B:
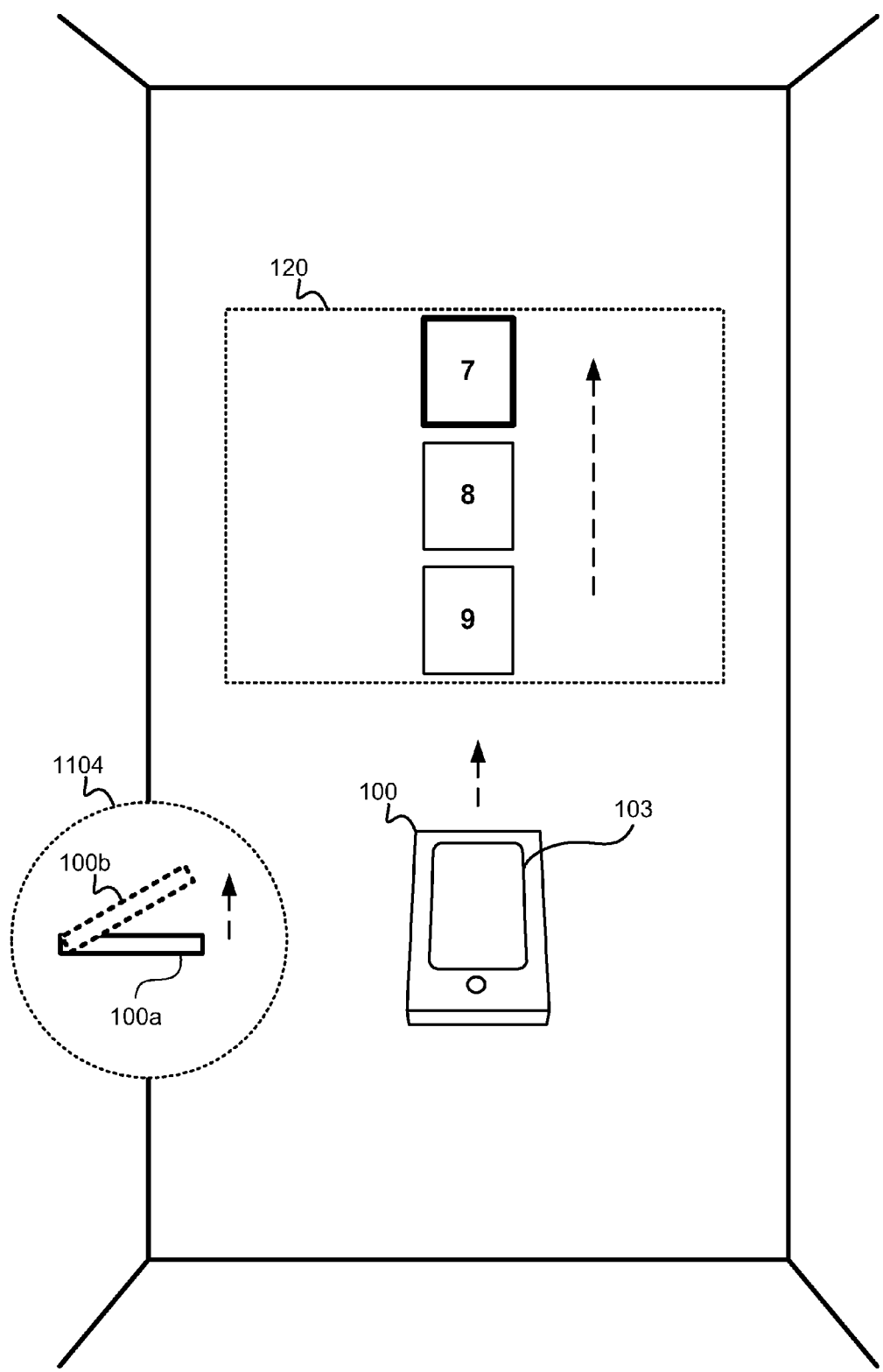

In a further aspect illustrated in FIGS. 11A and 11B, a mobile device 100 may be configured to highlight contents anywhere in a projected field 120 (as compared to the center of the projected field) based on a user's hand gesture and allow the user to select the highlighted content. In this aspect, a mobile device 100 may automatically highlight projected content based on the movement of the mobile device 100 with respect to the direction in which the mobile device 100 is pointing. Once a projected item is highlighted, the user may select that item by performing a touch gesture, hand gesture or by pressing a function key. For example, a mobile device 100 may project image objects 118 on an external surface within a projection field 120. Based on the angle of the mobile device 100, the mobile device 100 may be configured to highlight a particular portion of the projected image content. As shown in FIG. 11A, a mobile device 100 may project contents on an external surface within a projection field 120. The mobile device 100 may highlight image object 8 based on the direction in which the mobile device 100 is pointing. As the direction in which the mobile device 100 is pointing changes, the mobile device 100 may change the highlighted content. As shown in FIG. 11B, if the mobile device 100 is tilted to point upwards from its initial orientation shown in FIG. 11A, the mobile device 100 may highlight image object 7 which is positioned above image object 8 in the displayed list. The first and second orientations of the mobile device 100 are illustrated in the highlight 1104.

In a further aspect, the mobile device 100 may be configured to change function performed in response to various touch or hand gestures, such as from highlighting to navigating (e.g., scroll) or vice versa, based on the distance the mobile device 100 travels during a hand motion. In an aspect, the mobile device 100 may be configured to determine the distance the mobile device 100 moves in one direction during a hand gesture based upon sensor data. As the user moves the mobile device 100 in one direction, the mobile device 100 may highlight different projected items within the projected field 120. The highlighting of different projected contents may continue until a predetermined distance is traveled by the mobile device 100 during the hand gesture. Any movement of the mobile device 100 beyond the predetermined distance may be interpreted by the mobile device 100 as a navigation command, such as a command to implement scroll or zoom functions. This predetermined distance at which function changes are implemented may be based on the size of the projected field 120, user preferences, application developer settings, or other configurable parameters. For example, the larger the size of the projected field, the larger the predetermined distance the mobile device 100 may travel before it switched operations from selecting to scrolling function.

Figure 12:
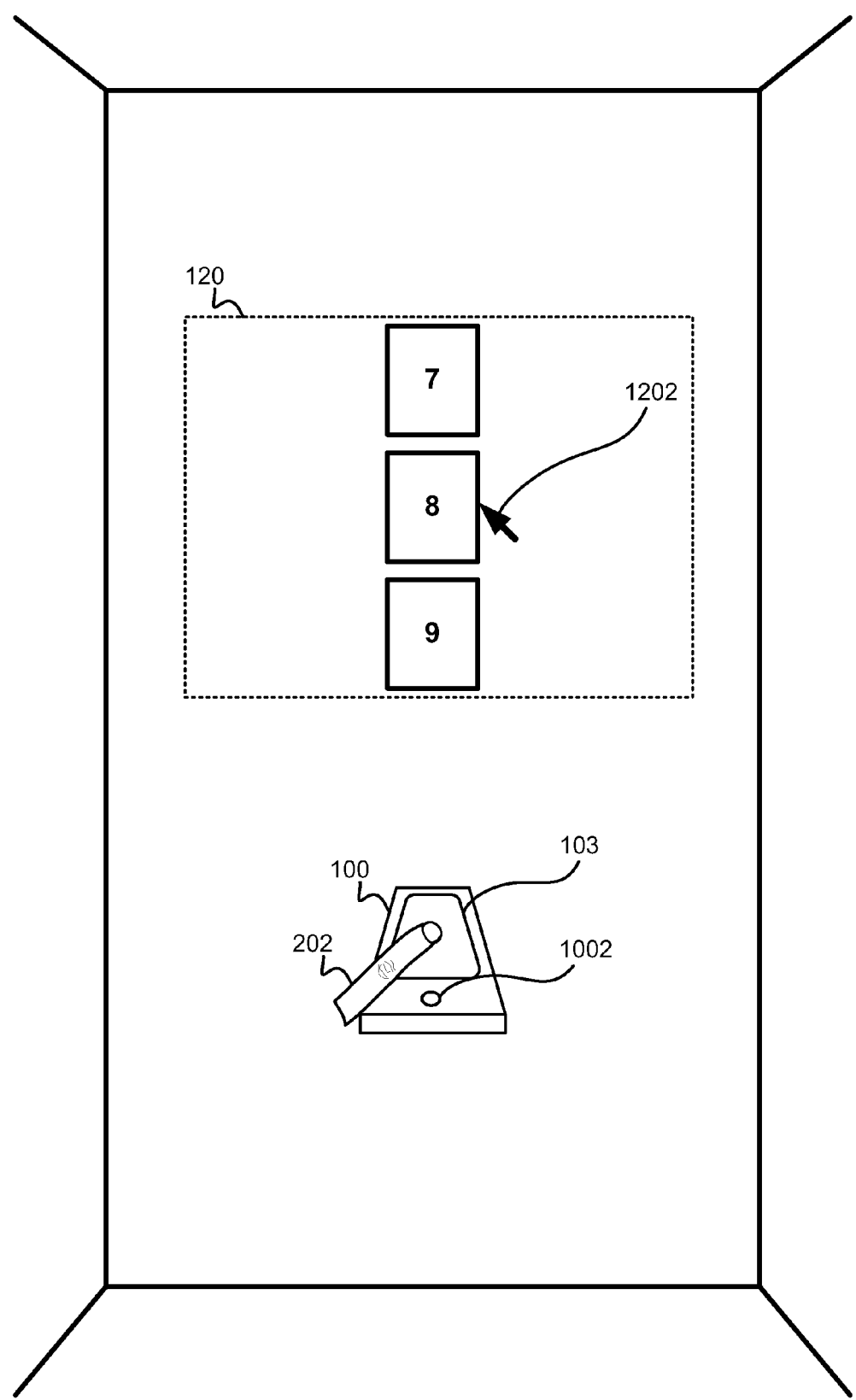
FIG. 12 is an illustration of a user interaction with a mobile device via a projected user interface using touch gestures to select content.

In a further aspect illustrated in FIG. 12, a mobile device 100 may be configured to enable a user to select projected content by using touch gestures. For example, a mobile device 100 may be configured to project a mouse arrow 1202 or other suitable pointer in response to the user's touch event on the touch screen display 103. The user may move the arrow by moving a finger on the touch screen to select items by placing the mouse arrow 1202 on the item and performing a second action, such as double tapping on the touch screen display 103 or pressing a function key 1002.

Figure 13:
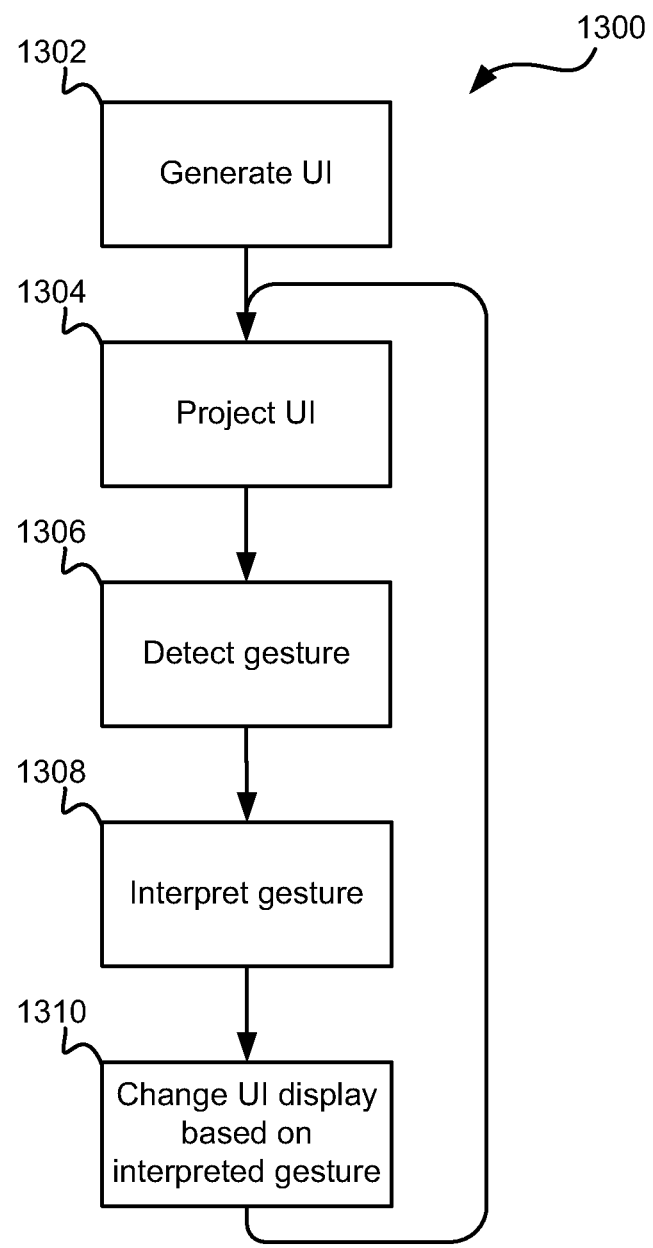
FIG. 13 is a process flow diagram of an aspect method for interacting with projected mobile device user interface.

An overview method 1300 illustrating the various aspects for interacting with a projected user interface is illustrated in FIG. 13. In method 1300 and block 1302, a mobile device processor may generate a user interface image, and project it onto an external surface in block 1304. The mobile device processor may be configured with software to detect a user input gesture (e.g., touch gesture or hand gesture) performed by the user in block 1306, and interpret the gesture in block 1308. In block 1310, the mobile device processor may change the user interface image based on the interpreted gesture, such as to implement any of the changes in displayed content described above. This changed user interface image is then projected in block 1304 to provide a continuous visual feedback to the user. The mobile device processor may continue to project the user interface while detecting and interpreting user inputs, and changing the projected user interface image accordingly in a continual process.

Figure 14:
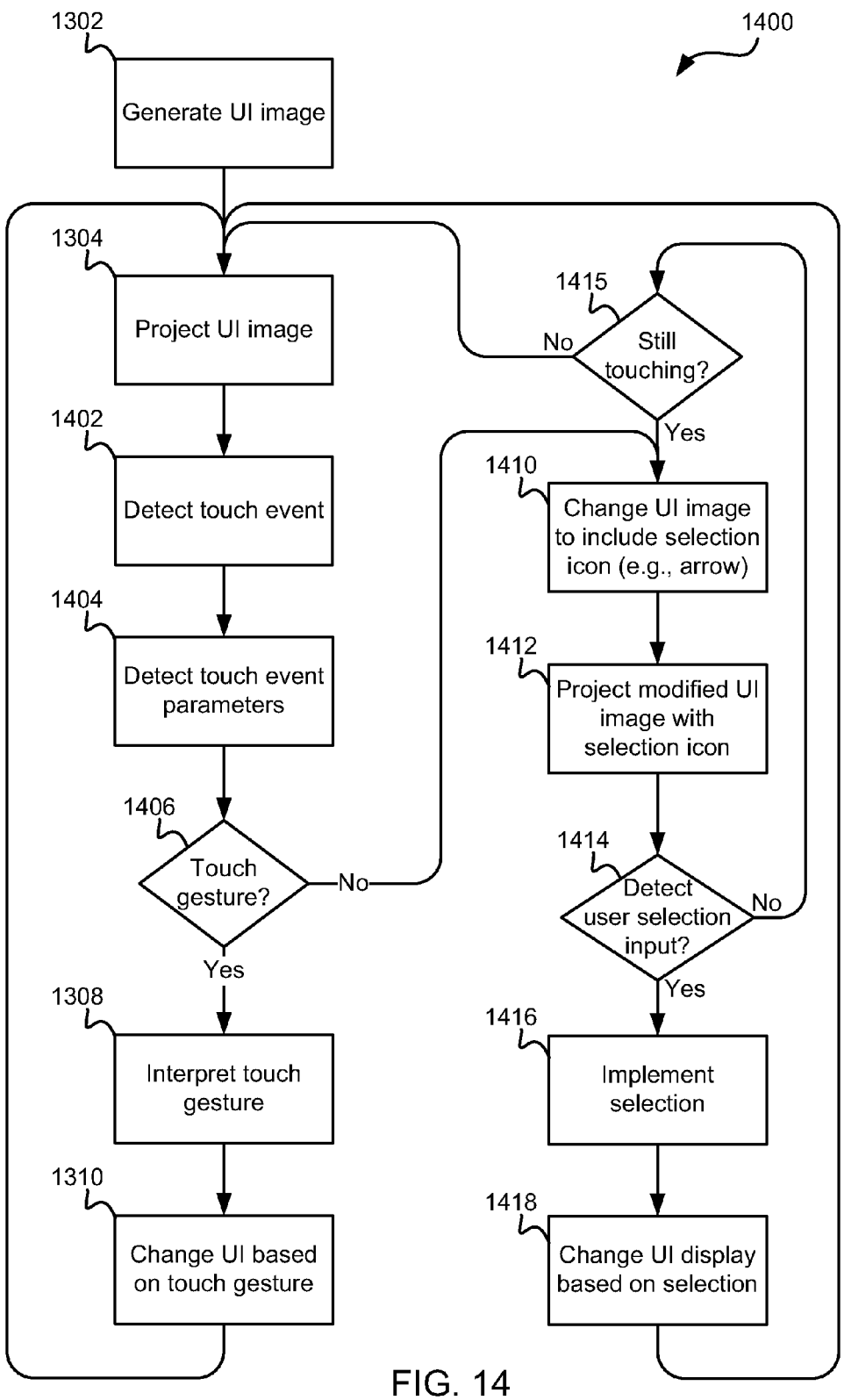
FIG. 14 is a process flow diagram of an aspect method for selecting projected mobile device user interface content.

Further details of an aspect method 1400 for implementing a projected user interface (UI) to enable a user to select a projected image object using a touch gesture is illustrated in FIG. 14. In method 1400 in block 1302, a mobile device processor may generate a user interface image, and project it onto an external surface in block 1304. The mobile device processor may be configured with software to detect touch events on the device's touch screen display 103 in block 1402, and measure the touch event parameters in block 1404. Touch event parameters may include the location, speed of movement, direction of movement and pressure of the touch event. In determination block 1406, the processor determine whether the detected touch event is associated with a touch gestures, such as by comparing the measured touch event parameters to predefined parameters associated with various touch gestures to determine if there is a match. If the processor determines that the touch event is a touch gesture (i.e., determination block 1406="Yes"), the mobile device processor may determine the functionality associated with the touch gesture in block 1308, change the user interface based on the determined touch gesture functionality in block 1310, and project the changed user interface image by returning to block 1304.

If the processor determines that the touch event is not a touch gesture (i.e., determination block 1406="No"), the mobile device processor may process the touch event as a selection input and change the projected user interface image to include a selection icon, such as a mouse arrow 1202, in block 1410. In block 1412, the mobile device may project the changed the projected user interface image to allow the user to view the location and follow the movement of the selection icon as it is projected on the external surface. In some cases the selection functionality may enable a user to maneuver the selection icon about on the projected user interface image before selecting an object. So, in determination block 1414 the processor may determine if the next user input indicates a user selection of an image object. For example, a user selection input may be in the form of a tap or double tap of the touch screen, a particular traced pattern, or a button press. If the processor determines that the latest incremental user input is not a user selection (i.e., determination block 1414="No"), such as may be the case while a user positions the selection icon on the desired object or a user lifts a finger from the touchscreen display without selecting an item, the processor may determine whether the user's finger is still touching the touchscreen display such that a touch event is still in process in determination block 1415. If the user's finger has left the touchscreen and no selection has been made (i.e., determination block 1415="No"), the processor may return to block 1304 to project the user interface image without an indication of the user touch (e.g., without a selection icon). If the user's finger is still touching the touchscreen and no selection has been made (i.e., determination block 1415="Yes"), the processor may continue the process of changing and projecting the user interface image may continue by returning to block 1410. If the mobile device processor detects a user selection input (i.e., determination block 1414="Yes"), the processor may implement the selected functionality or select an object in block 1416, and change the user interface image on the selection functionality in block 1418. The mobile device processor may project the changed user interface by returning to block 1304.

Figure 15:
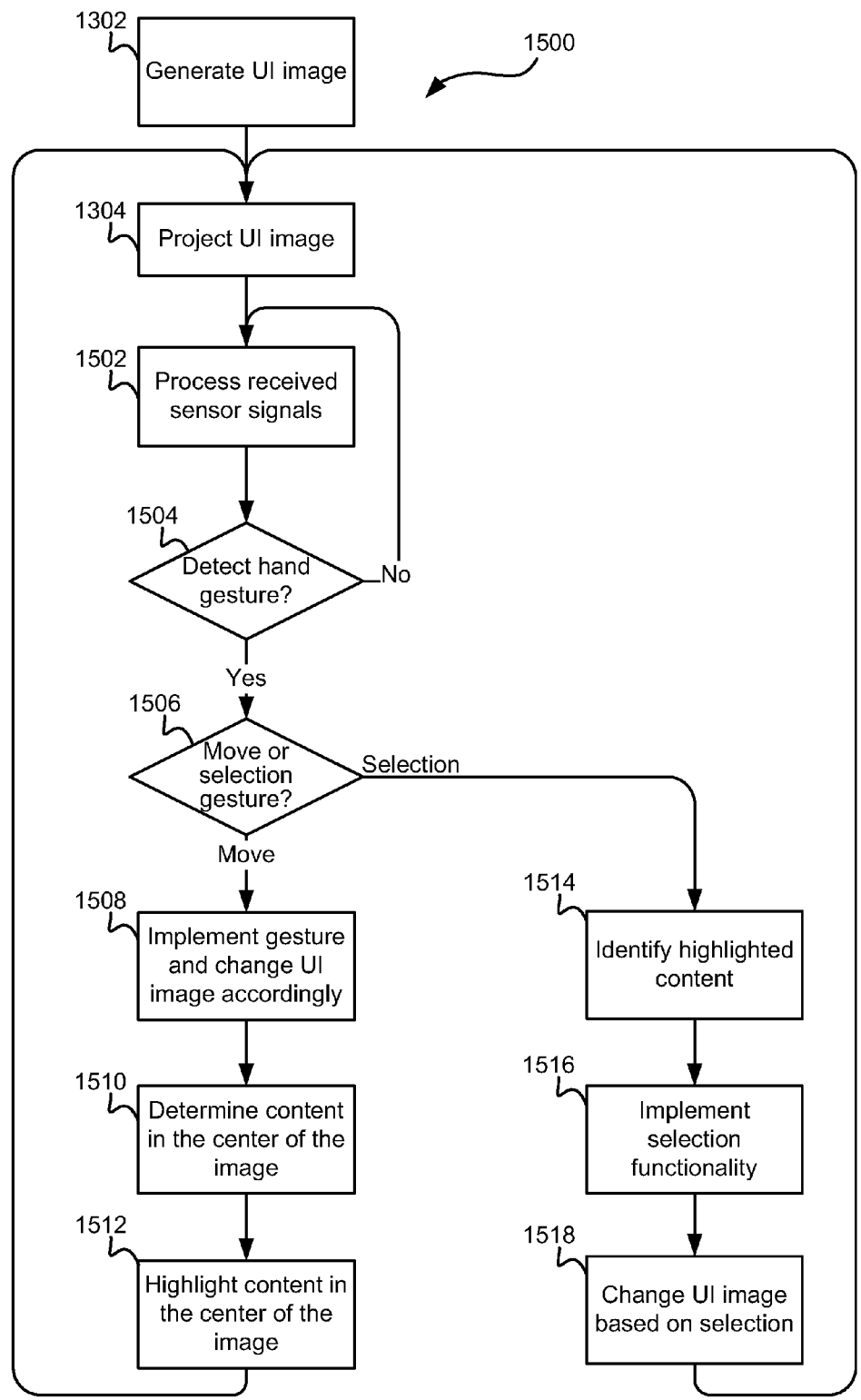
FIG. 15 is a process flow diagram of an embodiment method for selecting a projected content using hand gestures.

FIG. 15 illustrates of an embodiment method 1500 for a projected user interface enabling users to select items using hand gestures. In block 1302, a mobile device 100 may generate a user interface image, and project it onto an external surface in block 1304. In block 1502, the mobile device processor may process sensor inputs in order to recognize when a user implements a hand gesture. As discussed above, and gestures may be recognized based upon inputs received from accelerometers and/or compass sensors reflecting movements, rotation so tilting of the device. Particular hand gestures may be right highest by comparing received sensor inputs to predetermined patterns of sensor signals that correspond to particular input gestures. In determination block 1504, the processor may compare the received sensor signals to determine whether the signals are consistent with an intended user input gesture. For example, the received signals may be compared to threshold values to determine if a sensed amount of movement is sufficient to be interpreted as a move gesture. As another example, the pattern of the sensor signals may be compared to predefined patterns corresponding to particular user input gestures to determine if there is a match. If the processor determines that the received signals are not associated with a hand gesture (i.e., determination block 1504="No"), the mobile device 100 may continue to process received sensor signals by returning to block 1502.

When a user input gesture is recognized (i.e., determination block 1504="Yes"), the processor may determine the functionality associated with the recognized gesture (e.g., a scroll command), processor may determine whether the functionality associated with the recognized gesture involves a movement (e.g., a scroll command or movement of a pointer icon within the projected image) or a file selection gesture (e.g., a button press, a double tap on the touchscreen, etc.) in determination block 1506. If the processor determines that the recognized gesture is associated with a movement function (i.e., determination block 1506="Move"), the processor may implement the determined functionality, and change the user interface image accordingly in block 1508. In block 1510, the mobile device processor may determine the content that is located at the center of the projected frame (or some other portion of the projected frame) after the user interface image is changed. The mobile device processor may further change the user interface image to highlight the content that is located in the center in block 1512, and project the user interface image by returning to block 1304.

If the processor determines that the recognized gesture is associated with a selection function (i.e., determination block 1506="Selection"), the processor may identify the content highlighted in the projected user interface image in block 1504. In block 1516, the processor may implement the selection functionality corresponding to the recognized user input gesture. For example, the selection functionality may be a simple selection of a file or object for a subsequent action, copying of the selected object or file for pasting in another location, deleting or cutting the selected object or file, or activation of a selected application, the name but a few of the possible selection functionality may be implemented in the various aspects. In block 1518, the processor may change the user interface image based upon the selection functionality, such as to highlight or delete a selected file logic or implement a new display image associated with it activated application. The mobile device processor may then project be changed user interface image by returning to block 1304.

Figure 16:
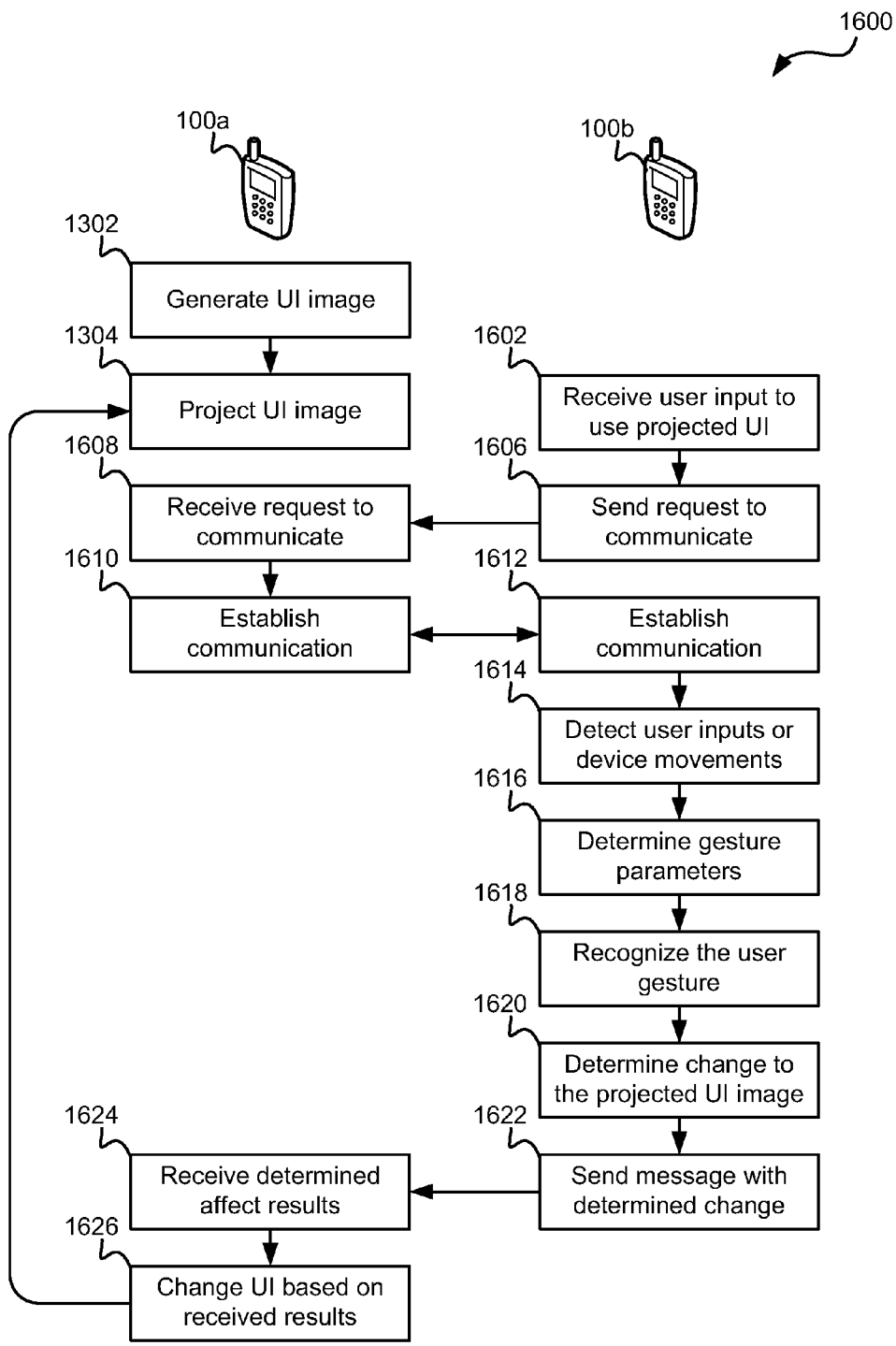
FIG. 16 is a process flow diagram of an aspect method for using one mobile device to interact with the projected mobile device user interface of another mobile device.

As described above, in some aspects multiple mobile devices may interact with each other in order to enable collaborative interactions with the projected user interface. An aspect method 1600 for enabling a second mobile device 100b to interact with a user-interface projected by a first mobile device 100a is illustrated in FIG. 16. In block 1302, a processor of the first mobile device 100a may generate a user interface image, and project the user interface on an external surface in block 1304. A processor in a second mobile device 100b may receive a user input requesting interaction with the projected user interface in block 1602. In block 1606, the processor of the second mobile device 100b may establish a communication link with the first mobile device 100a that is projecting the user interface image by sending a request to communicate to the first mobile device processor. The first mobile device 100a may receive the request to communicate from the second mobile device processor in block 1608, and negotiate a communication link with the second mobile device processor in blocks 1610 and 1612. Wireless communication technologies that may be used in the various aspects include Bluetooth or near field communication (NFC) communication technologies, which are well-known in the wireless communication arts. In block 1614, the second mobile device processor may detect user inputs, such as touch events on a touchscreen, button presses (e.g., arrow keys), or movements of the mobile device as described above, and determine the parameters of the received user inputs in block 1616. The second mobile device processor may use the received user input parameters (e.g., the speed and direction of a touch gesture, angle or acceleration of the device, etc.) to recognize the intended user gesture in block 1620. In block 1620, the second mobile device processor may determine the appropriate change to be made to the projected user interface image in response to the recognized user input gesture, such as the highlighting of an object, movement of an icon, scrolling of a list, etc. The second mobile device processor may send a message to the first mobile device communicating the determined appropriate change to be made to the projected user interface image in block 1622. The first mobile device processor may receive the message in block 1624, use the received message to change the user interface image in block 1626, and project the changed user interface image based by returning to block 1304. In this manner, the projected user interface image projected by the first mobile device 100a reflects the user input gestures performed on the second mobile device 100b. While FIG. 16 illustrates a process involving two mobile devices, any number of mobile devices may interact with the projecting mobile device 100a by implementing method 1600 or variations thereof.

In a further aspect, the projector may be configured to project user interface displays in a manner that affords users privacy so that only the user can see the projected image. In this aspect, the projector within the mobile device may be configured to project an image that can only be viewed by a person wearing special glasses, which may be similar to or the same as 3-D glasses. For example, the projector could project the user interface display for brief instances interspersed between periods of all white or a dummy image projection, and wear glasses which are configured to block the white or dummy image and permit viewing only of the instances of the user interface image. In this example, a user would be able to see the projected user interface image, while those not wearing such glasses would only see the white or dummy image. The time-controlled viewing technology for such glasses may be borrowed from 3-D display technologies. In a further example, the same technology as used to create 3-D images using two projectors and 3-D glasses discussed above may be used to create a private projected user-interface display by projecting a white screen in one projector while the other projector is projecting the user interface display for one eye or the other. In this aspect, a user not wearing 3-D glasses synchronized with the user's mobile device will see a white screen or very washed out projected image.

Figure 17A:
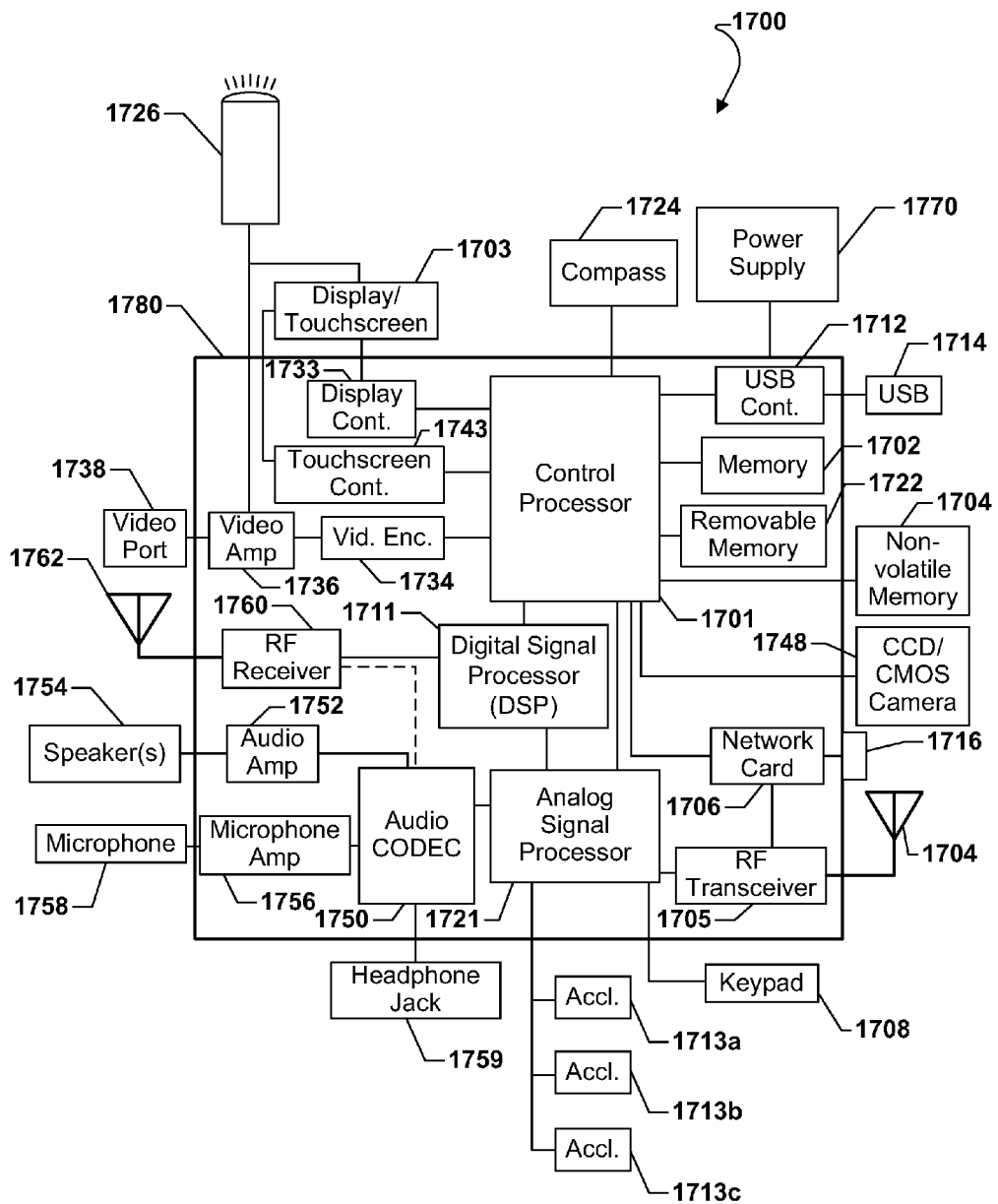
FIGS. 17A and 17B are component block diagrams of a mobile device suitable for use with the various aspects.

Typical mobile devices 1700 suitable for use with the various embodiments will have in common the components illustrated in FIG. 17A. A mobile device 1700 may include circuit board 1780 of electronic components, some or all of which may be integrated into an on-chip system, that includes a control processor 1701 coupled to memory 1702. The control processor 1701 may further be coupled to a digital signal processor 1711 and/or an analog signal processor 1721, which also be coupled together. In some embodiments, the control processor 1701 and a digital signal processor 1711 may be the same component or may be integrated into the same processor chip. A display controller 1733 and a touch-screen controller 1743 may be coupled to the control processor 1701 and to display or touchscreen display 1703 within or connected to the mobile device 1700.

The control processor 1701 may also be coupled to removable memory 1722 (e.g., an SD memory or SIM card in the case of mobile computing devices) and/or to external memory 1704, such as one or more of a disk drive, CD drive, and a DVD drive. The control processor 1701 may also be coupled to a Universal Serial Bus (USB) controller 1712 which couples to a USB port 1714. Also, a power supply 1770 may be coupled to the circuit board 1780 through the USB controller 1712 or through different electrical connections to provide power (e.g., DC power) to the various electronic components.

The control processor 1701 may also be coupled to a video encoder 1734, e.g., a phase alternating line (PAL) encoder, a sequential couleur a memoire (SECAM) encoder, or a national television system(s) committee (NTSC) encoder. Further, the video encoder 1734 may be coupled to a video amplifier 1736 which may be coupled to the video encoder 1734 and the display or touchscreen display 1703. Also, a video port 1738 may be coupled to the video amplifier 1736 to enable connecting the mobile device 1700 to an external monitor, television or other display (not shown).

In some embodiments, particularly mobile computing devices, the control processor 1701 may be coupled to a radio frequency (RF) transceiver 1705, such as via an analog signal processor 1721. The RF transceiver 1705 may be coupled to an RF antenna 1704 for transmitting and receiving RF signals. The RF transceiver 1705 may be configured to transmit and receive communication signals of one or more different wireless communication protocols including, for example, cellular telephone (e.g., G-3, UMTS, CDMA, etc.), WiFi, WiMax, and BlueTooth.

The control processor 1701 may further be coupled to a network card 1706 which may be coupled to a network connector 1716 and/or the RF transceiver 1705 and configured to enable communications via an external network (e.g., local area networks, the Internet, an intranet, WiFi networks, Blue-Tooth networks, personal area network (PAN) etc.) The network card 1706 may be in the form of a separate chip or card, or may be implemented as part of the control processor 1701 or the RF transceiver 1705 (or both) as a full solution communication chip.

A number of analog devices may be coupled to the control processor 1701 via the analog signal processor 1721, such as a keypad 1708 as shown in FIG. 17. In other implementations, a keypad or keyboard may include its own processor so that the interface with the control processor 1701 may be via direct connection (not shown), via a network connection (e.g., via the network card), or via the USB port 1714.

In some implementations, a digital camera 1748 may be coupled to the control processor 1701. In an exemplary aspect, the digital camera 1748 may be a charge-coupled device (CCD) camera or a complementary metal-oxide semiconductor (CMOS) camera. The digital camera 1748 may be built into the mobile device 1700 or coupled to the device by an external cable.

In some implementations, an audio CODEC 1750 (e.g., a stereo CODEC) may be coupled to the analog signal processor 1721 and configured to send sound signals to one or more speakers 1754 via an audio amplifier 1752. The audio CODEC 1750 may also be coupled to a microphone amplifier 1756 which may be coupled to a microphone 1758 (e.g., via a microphone jack). A headphone jack 1759 may also be coupled to the audio CODEC 1750 for outputting audio to headphones.

In some implementations, the mobile device 1700 may include a separate RF receiver circuit 1760 which may be coupled to an antenna 1762 for receiving broadcast wireless communication signals. The receiver circuit 1760 may be configured to receive broadcast television signals (e.g., FLO TV broadcasts), and provide received signals to the DSP 1711 for processing. In some implementations, the receiver circuit 1760 may be configured to receive FM radio signals, in which case the received signals may be passed to the Audio CODEC 1750 for processing.

The mobile device 1700 of the various aspects may also include a projector 1726, such as a pico projector, that is coupled to the control processor 1701, such as via the video amplifier 1736 and video encoder 1734. As discussed above, the projector 1726 may be configured to project images generated by the processor.

Figure 17B:
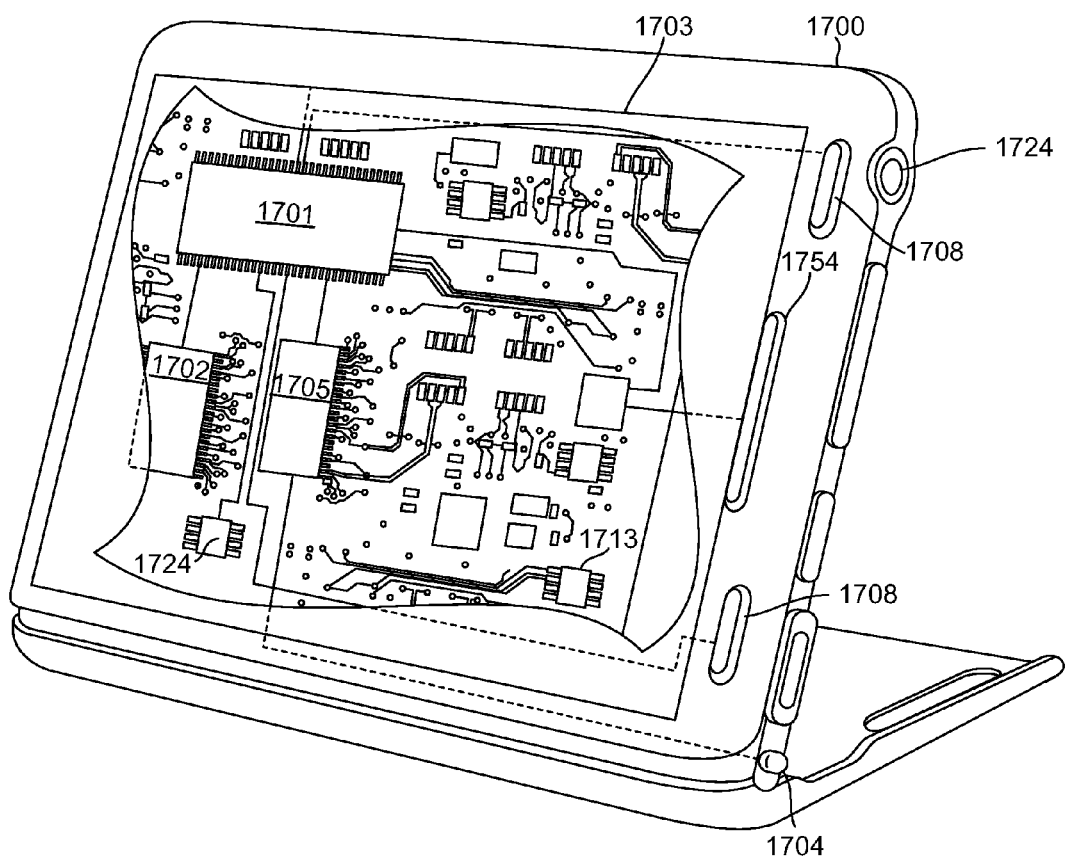

The mobile device 1700 may also include three accelerometers 1713a, 1713b, 1713c coupled to the control processor 1701. The accelerometers 1713a, 1713b, 1713c may be oriented along three perpendicular axes of the device and configured to detect the gravity gradient (i.e., the down vector) as well as other accelerations of the mobile device (e.g., from hand gestures). The control processor 1701 may be configured to determine the spatial orientation of the mobile device (e.g., tilt angle and rotational angle) with respect to the Earth based upon the signals from each of the accelerometers 1713a, 1713b, 1713c. The accelerometers 1713a, 1713b, 1713c may be packaged as three separate components (as illustrated in FIG. 17A) or as a single accelerometer chip 1713 (as illustrated in FIG. 17B). The mobile device 1700 may also include a digital compass 1724 coupled to the control processor 1701 and configured to detect a pointing direction with respect to the Earth's magnetic field.

The various components described above may be implemented in a mobile device configuration such as illustrated in FIG. 17B.

In an aspect, processor-executable instructions for accomplishing one or more of the method operations described above may be stored in the internal memory 1702, removable memory 1722 and/or non-volatile memory 1704 (e.g., as on a hard drive, CD drive, or other storage accessible via a network). Such processor-executable instructions may be executed by the control processor 1701 in order to perform the methods described herein.

While FIG. 17B illustrates a mobile computing device, other forms of computing devices, including personal computers and laptop computers, will typically also include a processor 1701 coupled to internal memory 1702, and a projector 1726. Thus, FIG. 17B is not intended to limit the scope of the claims to a mobile computing device in the particular illustrated form factor.

The processor 1701 may be any programmable microprocessor, microcomputer or multiple processor chip or chips that can be configured by software instructions (applications) to perform a variety of functions, including the functions of the various embodiments described herein. In some mobile devices, multiple processors 1701 may be provided, such as one processor dedicated to wireless communication functions and one processor dedicated to running other applications. Typically, software applications may be stored in the internal memory 1702 before they are accessed and loaded into the processor 1701. In some mobile devices, the processor 1701 may include internal memory sufficient to store the application software instructions. In some mobile devices, the secure memory may be in a separate memory chip coupled to the processor 1701. In many mobile devices 1700 the internal memory 1702 may be a volatile or nonvolatile memory, such as flash memory, or a mixture of both. For the purposes of this description, a general reference to memory refers to all memory accessible by the processor 1701, including internal memory 1702, removable memory plugged into the mobile device, and memory within the processor 1701 itself.

The processor 1701 may be any programmable microprocessor, microcomputer or multiple processor chip or chips that can be configured by software instructions (applications) to perform a variety of functions, including the functions of the various aspects described herein. In some mobile devices, multiple processors 1701 may be provided, such as one processor dedicated to wireless communication functions and one processor dedicated to running other applications. Typically, software applications may be stored in the internal memory 1702 before they are accessed and loaded into the processor 1701. In some mobile devices, the processor 1701 may include internal memory sufficient to store the application software instructions. In some mobile devices, additional memory chips (e.g., a Secure Data (SD) card) may be plugged into the device 1700 and coupled to the processor 1701. In many mobile devices, the internal memory 1702 may be a volatile or nonvolatile memory, such as flash memory, or a mixture of both. For the purposes of this description, a general reference to memory refers to all memory accessible by the processor 1701, including internal memory 1702, removable memory plugged into the mobile device, and memory within the processor 1701 itself, including the secure memory (not shown).

Various aspects may employ steerable optics to maintain the projected display on external surface generally stable while the mobile device is turned or tilted to accomplish hand gestures. FIG. 18 illustrates an example of a steerable protection system 1800. Such a steerable projection system 1800 may include a focusing/redirecting lens 1802 positioned within a lens frame 1804 that is coupled to actuators 1806, 1808. The actuators 1806, 1808 may be coupled to the mobile device processor 1701 (see FIG. 17). The focusing/redirecting lens 1802 may be positioned in front of a pico projector 1810 so that projected light passes through the focusing/redirecting lens 1802. The actuators 1806, 1808 may be configured to extend or retract in response to signals received from the processor 1701. By extending one actuator (e.g., actuator 1806) while retracting an opposite actuator (e.g., actuator 1808), the actuators may tilt the lens 1802 in such a manner to steer the projected image embedded by the pico projector 1810. In an implementation, as the mobile device processor recognizes movement of the device based on the information received from accelerometers and/or compass sensors, the processor may transmit control signals to the actuators 1806, 1808 to steer the projection so as to compensate for the detected device movements. The degree to which the projection can be steered will necessarily be limited by the optics and the travel achievable by the actuators 1806, 1808. The steerable projection system 1800 illustrated in FIG. 18 is merely one example of an image steering mechanism that may be used to steer the projected image, and other mechanisms may be implemented within the scope of the claims.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components in blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on a computer-readable medium. The steps of a method or algorithm disclosed herein may be embodied in a processor-executable software module executed which may reside on a tangible or non-transitory computer-readable storage medium. Computer-readable storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above also can be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method for providing a user interface for a mobile device comprising:
   projecting a first user interface image of a user interface onto an external surface within a projection frame, the projected first user interface image including a first subset of a plurality of image objects of the user interface visible within the projection frame;
   displaying on an electronic display of the mobile device a second user interface image of the user interface, the displayed second user interface image including a second subset of the plurality of image objects of the user interface, wherein the first subset includes more image objects of the user interface than the second subset;
   adjusting the projected first user interface image as the mobile device moves such that image objects that are visible within the projection frame appear fixed with respect to the external surface, such that at least one image object of the first subset of the plurality of image objects is no longer visible within the projection frame, and such that at least one image object of the plurality of image objects of the user interface that was not in the first subset of the plurality of image objects is now visible within the projection frame, while only the projection frame moves about on the external surface in response to a movement of the mobile device;
detecting a user input gesture by receiving signals from orientation sensors within the mobile device;
correlating the received sensor signals to a hand gesture;
identifying functionality associated with the correlated hand gesture;
implementing the identified functionality; and
changing the projected first user interface image based on the implemented functionality,
wherein implementing the identified functionality comprises accomplishing one of scrolling a list, changing a zoom factor applied to an image object displayed within the projected first user interface image, selecting an object within the projected first user interface image, copying an object displayed within the projected first user interface image, deleting an object displayed within the projected first user interface image, and executing an application associated with an object displayed within the projected first user interface image.

2. The method of claim 1, wherein detecting the user input gesture further comprises:
receiving a touch event from a touch screen display; and
correlating the received touch event to a particular touch gesture.

3. The method of claim 1, wherein projecting the first user interface image comprises projecting an image that appears to be three dimensional when viewed with 3-D glasses.

4. The method of claim 1, wherein the projected first user interface image is configured so that image objects appear positioned about a surface of a sphere, and wherein changing the projected first user interface image based on the interpreted gesture comprises changing the projected first user interface image so that the sphere appears to rotate about one or two axes to position different image objects in a foreground position.

5. The method of claim 1, further comprising:
highlighting an image object located in a center of the projected first user interface image; and
selecting the highlighted image object in response to a user input.

6. The method of claim 1, further comprising:
establishing a communication link with a second mobile device;
receiving a message from the second mobile device including information regarding changes to the projected first user interface image, wherein the information is based on a gesture received at the second mobile device; and
changing the projected first user interface image based on the information received from the second mobile device regarding changes to the projected first user interface image.

7. The method of claim 1, further comprising adjusting an angle of the projected first user interface image to maintain the projected first user interface image approximately steady within a limited angle of tilt or turn.

8. The method of claim 1, further comprising changing the projected first user interface image to maintain image objects in an approximately constant position with respect to the external surface onto which the projected first user interface image is projected.

9. The method of claim 1, wherein the orientation sensors comprise one or more accelerometers.

10. The method of claim 1, wherein correlating the received sensor signals to a hand gesture comprises recognizing the hand gesture as being one of a tilt of the mobile device, a turn of the mobile device, a rotation of the mobile device, and a rapid movement of the mobile device.

11. The method of claim 1, further comprising steering the projected first user interface image in an opposite direction of a direction of movement of the mobile device using steerable optics.

12. The method of claim 11, wherein the steerable optics comprises a servo.

13. The method of claim 1, wherein the plurality of image objects comprises items of a list of items, the first subset of the plurality of image objects comprises a first subset of the items of the list of items, the second subset of the plurality of image objects comprises a second subset of the items of the list of items, the first subset of the items includes more items of the list of items than the second subset of items, the second subset includes at least one item of the list of items.

14. The method of claim 13, wherein the items of the list of items comprise contacts.

15. A mobile device, comprising:
an electronic display;
a projector; and
a processor coupled to the projector and the electronic display, wherein the processor is configured with processor executable instructions to perform operations comprising:
projecting a first user interface image of a user interface onto an external surface within a projection frame, the projected first user interface image including a first subset of a plurality of image objects of the user interface visible within the projection frame;
displaying on the electronic display of the mobile device a second user interface image of the user interface, the displayed second user interface image including a second subset of the plurality of image objects of the user interface, wherein the first subset includes more image objects of the user interface than the second subset;
adjusting the projected first user interface image as the mobile device moves such that image objects that are visible within the projection frame appear fixed with respect to the external surface, such that at least one image object of the first subset of the plurality of image objects is no longer visible within the projection frame, and such that at least one image object of the plurality of image objects of the user interface that was not in the first subset of the plurality of image objects is now visible within the projection frame, while only the projection frame moves about on the external surface in response to a movement of the mobile device;
detecting a user input gesture by receiving signals from orientation sensors within the mobile device;
correlating the received sensor signals to a hand gesture;
identifying functionality associated with the correlated hand gesture;
implementing the identified functionality; and
changing the projected first user interface image based on the implemented functionality,
wherein implementing the identified functionality comprises accomplishing one of scrolling a list, changing a zoom factor applied to an image object displayed within the projected first user interface image, selecting an object within the projected first user interface image, copying an object displayed within the projected first user interface image, deleting an object displayed within the projected first user interface image, and executing an application associated with an object displayed within the projected first user interface image.

16. The mobile device of claim 15, wherein the processor is configured with processor-executable instructions to perform operations such that detecting a user input gesture further comprises:
   receiving a touch event from a touch screen display; and
   correlating the received touch event to a particular touch gesture.

17. The mobile device of claim 15, wherein the processor is configured with processor-executable instructions to perform operations such that projecting the first user interface image comprises projecting an image that appears to be three dimensional when viewed with 3-D glasses.

18. The mobile device of claim 15, wherein the processor is configured with processor-executable instructions to perform operations such that:
   the projected first user interface image is configured so that image objects appear positioned about a surface of a sphere; and
   changing the projected first user interface image based on the interpreted gesture comprises changing the projected first user interface image so that the sphere appears to rotate about one or two axes to position different image objects in a foreground position.

19. The mobile device of claim 15, wherein the processor is configured with processor-executable instructions to perform operations further comprising:
   highlighting an image object located in a center of the projected first user interface image; and
   selecting the highlighted image object in response to a user input.

20. The mobile device of claim 15, wherein the processor is configured with processor-executable instructions to perform operations further comprising:
   establishing a communication link with a second mobile device;
   receiving a message from the second mobile device including information regarding changes to the projected first user interface image, wherein the information is based on a gesture received at the second mobile device; and
   changing the projected first user interface image based on the information received from the second mobile device regarding changes to the projected first user interface image.

21. The mobile device of claim 15, wherein the processor is configured with processor-executable instructions to perform operations further comprising adjusting an angle of the projected first user interface image to maintain the projected first user interface image approximately steady within a limited angle of tilt or turn.

22. The mobile device of claim 15, wherein the processor is configured with processor-executable instructions to perform operations further comprising changing the projected first user interface image to maintain image objects in an approximately constant position with respect to the external surface onto which the projected first user interface image is projected.

23. The mobile device of claim 15, wherein the orientation sensors comprise one or more accelerometers.

24. The mobile device of claim 15, wherein the processor is configured with processor-executable instructions to perform operations such that correlating the received sensor signals to a hand gesture comprises recognizing the hand gesture as being one of a tilt of the mobile device, a turn of the mobile device, a rotation of the mobile device, and a rapid movement of the mobile device.

25. The mobile device of claim 15, wherein the processor is configured with processor-executable instructions to perform operations such that the projected first user interface image is steered in an opposite direction of a direction of movement of the mobile device using steerable optics.

26. The mobile device of claim 25, wherein the steerable optics comprises a servo.

27. A mobile device, comprising:
   means for projecting a first user interface image of a user interface onto an external surface within a projection frame so that the projected first user interface image includes a first subset of a plurality of image objects of the user interface visible within the projection frame;
   means for displaying on an electronic display of the mobile device a second user interface image of the user interface, the displayed second user interface image including a second subset of the plurality of image objects of the user interface, wherein the first subset includes more image objects of the user interface than the second subset;
   means for adjusting the projected first user interface image as the mobile device moves such that image objects that are visible within the projection frame appear fixed with respect to the external surface, such that at least one image object of the first subset of the plurality of image objects is no longer visible within the projection frame, and such that at least one image object of the plurality of image objects of the user interface that was not in the first subset of the plurality of image objects is now visible within the projection frame, while only the projection frame moves about on the external surface in response to a movement of the mobile device;
   means for detecting a user input gesture by receiving signals from orientation sensors within the mobile device;
   means for correlating the received sensor signals to a hand gesture;
   means for identifying functionality associated with the correlated hand gesture;
   means for implementing the identified functionality; and
   means for changing the projected first user interface image based on the-implemented functionality,
   wherein means for implementing the identified functionality comprises means for accomplishing one of scrolling a list, changing a zoom factor applied to an image object displayed within the projected first user interface image, selecting an object within the projected first user interface image, copying an object displayed within the projected first user interface image, deleting an object displayed within the projected first user interface image, and executing an application associated with an object displayed within the projected first user interface image.

28. The mobile device of claim 27, wherein means for detecting a user input gesture further comprises:
   means for receiving a touch event from a touch screen display; and
   means for correlating the received touch event to a particular touch gesture.

29. The mobile device of claim 27, wherein means for projecting the first user interface image comprises means for projecting an image that appears to be three dimensional when viewed with 3-D glasses.

30. The mobile device of claim 27, wherein:
means for projecting the first user interface image comprises means for projecting an image so that image objects appear positioned about a surface of a sphere; and
means for changing the projected first user interface image based on the interpreted gesture comprises means for changing the projected first user interface image so that the sphere appears to rotate about one or two axes to position different image objects in a foreground position.

31. The mobile device of claim 27, further comprising:
means for highlighting an image object located in a center of the projected first user interface image; and
means for selecting the highlighted image object in response to a user input.

32. The mobile device of claim 27, further comprising:
means for establishing a communication link with a second mobile device;
means for receiving a message from the second mobile device including information regarding changes to the projected first user interface image, wherein the information is based on a gesture received at the second mobile device; and
means for changing the projected first user interface image based on the information received from the second mobile device regarding changes to the projected first user interface image.

33. The mobile device of claim 27, further comprising means for adjusting an angle of the projected first user interface image to maintain the projected first user interface image approximately steady within a limited angle of tilt or turn.

34. The mobile device of claim 27, further comprising means for changing the projected first user interface image to maintain image objects in an approximately constant position with respect to the external surface onto which the projected first user interface image is projected.

35. The mobile device of claim 27, wherein means for sensing orientation of the mobile device comprises one or more accelerometers.

36. The mobile device of claim 27, wherein means for correlating the received sensor signals to a hand gesture comprises means for recognizing the hand gesture as being one of a tilt of the mobile device, a turn of the mobile device, a rotation of the mobile device, and a rapid movement of the mobile device.

37. The mobile device of claim 27, further comprising means for steering the projected first user interface image in an opposite direction of a direction of movement of the mobile device using steerable optics.

38. The mobile device of claim 37, wherein the steerable optics comprises a servo.

39. A non-transitory processor-readable storage medium having stored thereon processor-executable instructions configured to cause a processor of a mobile device to perform operations comprising:
projecting a first user interface image of a user interface onto an external surface within a projection frame, the projected first user interface image including a first subset of a plurality of image objects of the user interface visible within the projection frame;
displaying on an electronic display of the mobile device a second user interface image of the user interface, the displayed second user interface image including a second subset of the plurality of image objects of the user interface, wherein the first subset includes more image objects of the user interface than the second subset;
adjusting the projected first user interface image as the mobile device moves such that that image objects that are visible within the projection frame appear fixed with respect to the external surface, such that at least one image object of the first subset of the plurality of image objects is no longer visible within the projection frame, and such that at least one image object of the plurality of image objects of the user interface that was not in the first subset of the plurality of image objects is now visible within the projection frame, while only the projection frame moves about on the external surface in response to a movement of the mobile device;
detecting a user input gesture by receiving signals from orientation sensors within the mobile device;
correlating the received sensor signals to a hand gesture;
identifying functionality associated with the correlated hand gesture;
implementing the identified functionality; and
changing the projected first user interface image based on the implemented functionality,
wherein implementing the identified functionality comprises accomplishing one of scrolling a list, changing a zoom factor applied to an image object displayed within the projected first user interface image, selecting an object within the projected first user interface image, copying an object displayed within the projected user interface image, deleting an object displayed within the projected first user interface image, and executing an application associated with an object displayed within the projected first user interface image.

40. The non-transitory processor-readable storage medium of claim 39, wherein the stored processor-executable instructions are configured to cause a processor of a mobile device to perform operations such that detecting a user input gesture further comprises:
receiving a touch event from a touch screen display; and
correlating the received touch event to a particular touch gesture.

41. The non-transitory processor-readable storage medium of claim 39, wherein the stored processor-executable instructions are configured to cause a processor of a mobile device to perform operations such that projecting the first user interface image comprises projecting an image that appears to be three dimensional when viewed with special 3-D glasses.

42. The non-transitory processor-readable storage medium of claim 39, wherein the stored processor-executable instructions are configured to cause a processor of a mobile device to perform operations such that:
the projected first user interface image is configured so that image objects appear positioned about a surface of a sphere; and
changing the projected first user interface image based on the interpreted gesture comprises changing the projected first user interface image so that the sphere appears to rotate about one or two axes to position different image objects in a foreground position.

43. The non-transitory processor-readable storage medium of claim 39, wherein the stored processor-executable instructions are configured to cause a processor of a mobile device to perform operations further comprising:
highlighting an image object located in a center of the projected first user interface image; and
selecting the highlighted image object in response to a user input.

44. The non-transitory processor-readable storage medium of claim 39, wherein the stored processor-executable instructions are configured to cause a processor of a mobile device to perform operations further comprising:
    establishing a communication link with a second mobile device;
    receiving a message from the second mobile device including information regarding changes to the projected first user interface image, wherein the information is based on a gesture received at the second mobile device; and
    changing the projected first user interface image based on the information received from the second mobile device regarding changes to the projected first user interface image.

45. The non-transitory processor-readable storage medium of claim 39, wherein the stored processor-executable instructions are configured to cause a processor of a mobile device to perform operations further comprising adjusting an angle of the projected first user interface image to maintain the projected first user interface image approximately steady within a limited angle of tilt or turn.

46. The non-transitory processor-readable storage medium of claim 39, wherein the stored processor-executable instructions are configured to cause a processor of a mobile device to perform operations further comprising changing the projected first user interface image to maintain image objects in an approximately constant position with respect to the external surface onto which the projected first user interface image is projected.

47. The non-transitory processor-readable storage medium of claim 39, wherein the orientation sensors comprise one or more accelerometers.

48. The non-transitory processor-readable storage medium of claim 39, wherein the stored processor-executable instructions are configured to cause a processor of a mobile device to perform operations such that correlating the received sensor signals to a hand gesture comprises recognizing the hand gesture as being one of a tilt of the mobile device, a turn of the mobile device, a rotation of the mobile device, and a rapid movement of the mobile device.

49. The non-transitory processor-readable storage medium of claim 39, wherein the stored processor-executable instructions are configured to cause a processor of a mobile device to perform operations such that the projected first user interface image is steered in an opposite direction of a direction of movement of the mobile device using steerable optics.

50. The non-transitory processor-readable storage medium of claim 49, wherein the steerable optics comprises a servo.

* * * * *